United States Patent
Nielsen et al.

(10) Patent No.: US 11,212,561 B2
(45) Date of Patent: *Dec. 28, 2021

(54) APPARATUS AND METHODS FOR EFFICIENT DELIVERY OF ELECTRONIC PROGRAM GUIDE DATA

(71) Applicant: Time Warner Cable Enterprises LLC, St. Louis, MO (US)

(72) Inventors: Nicholas Nielsen, Erie, CO (US); Thomas Reed, Boulder, CO (US); Eric Hybertson, Parker, CO (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 109 days.

This patent is subject to a terminal disclaimer.

(21) Appl. No.: 16/792,089

(22) Filed: Feb. 14, 2020

(65) Prior Publication Data

US 2020/0186843 A1 Jun. 11, 2020

Related U.S. Application Data

(63) Continuation of application No. 15/954,478, filed on Apr. 16, 2018, now Pat. No. 10,567,814, which is a (Continued)

(51) Int. Cl.
*H04N 21/235* (2011.01)
*H04N 21/435* (2011.01)
(Continued)

(52) U.S. Cl.
CPC ....... *H04N 21/2358* (2013.01); *H04N 21/222* (2013.01); *H04N 21/25825* (2013.01); *H04N 21/4358* (2013.01); *H04N 21/4821* (2013.01)

(58) Field of Classification Search
CPC ............ H04N 21/2358; H04N 21/222; H04N 21/25825; H04N 21/4358; H04N 21/4821
See application file for complete search history.

(56) References Cited

U.S. PATENT DOCUMENTS

| 4,203,130 A | 5/1980 | Doumit et al. |
| 4,264,925 A | 4/1981 | Freeman et al. |

(Continued)

FOREIGN PATENT DOCUMENTS

| EP | 0701367 A2 | 3/1996 |
| EP | 0725538 A2 | 8/1996 |

(Continued)

OTHER PUBLICATIONS

US 6,940,674 B2, 09/2005, Sakamoto (withdrawn)
(Continued)

*Primary Examiner* — Nicholas T Corbo
(74) *Attorney, Agent, or Firm* — Gazdzinski & Associates, PC

(57) ABSTRACT

Apparatus and method for improving the bandwidth efficiency of delivering electronic program guide (EPG) data to consumer premises equipment (CPE). In one exemplary embodiment, electronic guide data is rendered by devices away from the CPE, shifting the executing data- and bandwidth-heavy operations away from the CPE. In particular, one or more gateways at the user's home bears the processing, memory, bandwidth load to reduce the inefficiency of delivering redundant information to CPE(s) interfacing with the gateway(s). Using guide data it receives from the cloud, the gateway produces and delivers to the CPE one or more "simple views" of the guide data, including a video stream, still image, or simple HTML or other renderable formats. As the end user interacts with the CPE, the user receives a series of the simple views, allowing the rich experience that is typically given by EPG rendered directly by the CPE.

20 Claims, 11 Drawing Sheets

Related U.S. Application Data continuation of application No. 14/541,035, filed on Nov. 13, 2014, now Pat. No. 9,948,962.

(51) Int. Cl.
*H04N 21/482* (2011.01)
*H04N 21/258* (2011.01)
*H04N 21/222* (2011.01)

(56) References Cited

U.S. PATENT DOCUMENTS

| | | |
|---|---|---|
| 4,381,522 A | 4/1983 | Lambert |
| 4,461,205 A | 7/1984 | Shuler |
| 4,602,279 A | 7/1986 | Freeman |
| 4,641,205 A | 2/1987 | Beyers, Jr. |
| 4,677,501 A | 6/1987 | Saltzman et al. |
| 4,691,351 A | 9/1987 | Hayashi et al. |
| 4,706,121 A | 11/1987 | Young et al. |
| 4,751,578 A | 6/1988 | Reiter et al. |
| 4,807,052 A | 2/1989 | Amano |
| 4,862,268 A | 8/1989 | Campbell et al. |
| 4,890,321 A | 12/1989 | Seth-Smith et al. |
| 4,896,347 A | 1/1990 | Auber |
| 4,930,158 A | 5/1990 | Vogel |
| 4,963,994 A | 10/1990 | Levine |
| 4,977,455 A | 12/1990 | Young |
| 4,991,011 A | 2/1991 | Johnson et al. |
| 5,003,384 A | 3/1991 | Durden et al. |
| 5,027,400 A | 6/1991 | Baji et al. |
| 5,038,211 A | 8/1991 | Hallenbeck |
| 5,047,867 A | 9/1991 | Strubbe et al. |
| 5,093,718 A | 3/1992 | Hoarty et al. |
| 5,144,663 A | 9/1992 | Kudelski et al. |
| 5,151,782 A | 9/1992 | Ferraro |
| 5,151,789 A | 9/1992 | Young |
| 5,168,353 A | 12/1992 | Walker et al. |
| 5,172,413 A | 12/1992 | Bradley et al. |
| 5,182,640 A | 1/1993 | Takano |
| 5,200,823 A | 4/1993 | Yoneda et al. |
| 5,220,420 A | 6/1993 | Hoarty et al. |
| 5,223,924 A | 6/1993 | Strubbe |
| 5,245,420 A | 9/1993 | Harney et al. |
| 5,247,364 A | 9/1993 | Banker et al. |
| 5,253,066 A | 10/1993 | Vogel et al. |
| 5,285,272 A | 2/1994 | Bradley et al. |
| 5,293,357 A | 3/1994 | Hallenbeck |
| 5,301,028 A | 4/1994 | Banker et al. |
| 5,307,173 A | 4/1994 | Yuen et al. |
| 5,317,391 A | 5/1994 | Banker et al. |
| 5,323,240 A | 6/1994 | Amano et al. |
| 5,335,079 A | 8/1994 | Yuen et al. |
| 5,335,277 A | 8/1994 | Harvey et al. |
| 5,353,121 A | 10/1994 | Young et al. |
| 5,357,276 A | 10/1994 | Banker et al. |
| 5,359,601 A | 10/1994 | Wasilewski et al. |
| 5,361,173 A | 11/1994 | Ishii et al. |
| 5,371,551 A | 12/1994 | Logan et al. |
| 5,371,795 A | 12/1994 | Vogel |
| 5,382,983 A | 1/1995 | Kwoh et al. |
| 5,400,401 A | 3/1995 | Wasilewski et al. |
| 5,404,393 A | 4/1995 | Remillard |
| 5,410,343 A | 4/1995 | Coddington et al. |
| 5,410,344 A | 4/1995 | Graves et al. |
| 5,412,416 A | 5/1995 | Nemirofsky |
| 5,412,720 A | 5/1995 | Hoarty |
| 5,416,508 A | 5/1995 | Sakuma et al. |
| 5,418,782 A | 5/1995 | Wasilewski |
| 5,425,101 A | 6/1995 | Woo et al. |
| 5,434,626 A | 7/1995 | Hayashi et al. |
| 5,436,676 A | 7/1995 | Pint et al. |
| 5,436,917 A | 7/1995 | Karasawa |
| 5,440,336 A | 8/1995 | Buhro et al. |
| 5,444,499 A | 8/1995 | Saitoh |
| 5,446,488 A | 8/1995 | Vogel |
| 5,448,568 A | 9/1995 | Delpuch et al. |
| 5,459,506 A | 10/1995 | Bushnell |
| 5,459,522 A | 10/1995 | Pint |
| 5,459,789 A | 10/1995 | Tamer et al. |
| 5,465,113 A | 11/1995 | Gilboy |
| 5,465,385 A | 11/1995 | Ohga et al. |
| 5,469,206 A | 11/1995 | Strubbe et al. |
| 5,469,431 A | 11/1995 | Wendorf et al. |
| 5,473,609 A | 12/1995 | Chaney |
| 5,477,262 A | 12/1995 | Banker et al. |
| 5,477,263 A | 12/1995 | O'Callaghan et al. |
| 5,479,266 A | 12/1995 | Young et al. |
| 5,479,268 A | 12/1995 | Young et al. |
| 5,481,542 A | 1/1996 | Logston et al. |
| 5,483,278 A | 1/1996 | Strubbe et al. |
| 5,485,221 A | 1/1996 | Banker et al. |
| 5,491,748 A | 2/1996 | Auld, Jr. et al. |
| 5,493,339 A | 2/1996 | Birch et al. |
| 5,495,295 A | 2/1996 | Long |
| 5,497,187 A | 3/1996 | Banker et al. |
| 5,499,046 A | 3/1996 | Schiller et al. |
| 5,499,103 A | 3/1996 | Mankovitz |
| 5,502,504 A | 3/1996 | Marshall et al. |
| 5,508,815 A | 4/1996 | Levine |
| 5,515,106 A | 5/1996 | Chaney et al. |
| 5,515,173 A | 5/1996 | Mankovitz et al. |
| 5,517,257 A | 5/1996 | Dunn et al. |
| 5,528,282 A | 6/1996 | Voeten et al. |
| 5,528,304 A | 6/1996 | Cherrick et al. |
| 5,532,732 A | 7/1996 | Yuen et al. |
| 5,532,754 A | 7/1996 | Young et al. |
| 5,534,911 A | 7/1996 | Levitan |
| 5,539,391 A | 7/1996 | Yuen |
| 5,539,822 A | 7/1996 | Lett |
| 5,539,920 A | 7/1996 | Menand et al. |
| 5,541,738 A | 7/1996 | Mankovitz |
| 5,543,852 A | 8/1996 | Yuen et al. |
| 5,543,927 A | 8/1996 | Herz |
| 5,543,929 A | 8/1996 | Mankovitz et al. |
| 5,544,354 A | 8/1996 | May et al. |
| 5,548,345 A | 8/1996 | Brian et al. |
| 5,548,532 A | 8/1996 | Menand et al. |
| 5,550,576 A | 8/1996 | Klosterman |
| 5,550,579 A | 8/1996 | Martinez |
| 5,550,640 A | 8/1996 | Tsuboi et al. |
| 5,552,837 A | 9/1996 | Mankovitz |
| 5,555,441 A | 9/1996 | Haddad |
| 5,555,549 A | 9/1996 | Nakaishi |
| 5,559,548 A | 9/1996 | Davis et al. |
| 5,559,549 A | 9/1996 | Hendricks et al. |
| 5,559,550 A | 9/1996 | Mankovitz |
| 5,563,648 A | 10/1996 | Menand et al. |
| 5,576,755 A | 11/1996 | Davis et al. |
| 5,579,055 A | 11/1996 | Hamilton et al. |
| 5,579,057 A | 11/1996 | Banker et al. |
| 5,579,183 A | 11/1996 | Van et al. |
| 5,581,614 A | 12/1996 | Ng et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,872 A | 12/1996 | Martinez |
| 5,589,892 A | 12/1996 | Knee et al. |
| 5,592,551 A | 1/1997 | Lett et al. |
| 5,594,509 A | 1/1997 | Florin et al. |
| 5,596,361 A | 1/1997 | Martinez |
| 5,600,378 A | 2/1997 | Wasilewski |
| 5,619,247 A | 4/1997 | Russo |
| 5,619,274 A | 4/1997 | Roop et al. |
| 5,621,456 A | 4/1997 | Florin et al. |
| 5,621,579 A | 4/1997 | Yuen |
| 5,623,613 A | 4/1997 | Rowe et al. |
| 5,625,406 A | 4/1997 | Newberry |
| 5,629,733 A | 5/1997 | Youman et al. |
| 5,630,119 A | 5/1997 | Aristides et al. |
| 5,633,683 A | 5/1997 | Rosengren et al. |
| 5,635,978 A | 6/1997 | Alten et al. |
| 5,635,989 A | 6/1997 | Rothmuller |
| 5,640,484 A | 6/1997 | Mankovitz |
| 5,642,153 A | 6/1997 | Chaney et al. |

(56) References Cited

U.S. PATENT DOCUMENTS

| | | |
|---|---|---|
| 5,648,824 A | 7/1997 | Dunn et al. |
| 5,654,748 A | 8/1997 | Matthews |
| 5,657,072 A | 8/1997 | Aristides et al. |
| 5,657,414 A | 8/1997 | Lett et al. |
| 5,659,367 A | 8/1997 | Yuen |
| 5,671,276 A | 9/1997 | Eyer et al. |
| 5,671,377 A | 9/1997 | Bleidt et al. |
| 5,671,386 A | 9/1997 | Blair et al. |
| 5,671,411 A | 9/1997 | Watts et al. |
| 5,673,089 A | 9/1997 | Yuen et al. |
| 5,677,708 A | 10/1997 | Matthews, III et al. |
| 5,682,597 A | 10/1997 | Ganek et al. |
| 5,684,525 A | 11/1997 | Klosterman |
| 5,687,275 A | 11/1997 | Lane et al. |
| 5,699,360 A | 12/1997 | Nishida et al. |
| 5,710,970 A | 1/1998 | Walters et al. |
| 5,721,878 A | 2/1998 | Ottesen et al. |
| 5,727,113 A | 3/1998 | Shimoda |
| 5,729,280 A | 3/1998 | Inoue et al. |
| 5,729,648 A | 3/1998 | Boyce et al. |
| 5,734,589 A | 3/1998 | Kostreski et al. |
| 5,734,597 A | 3/1998 | Molnar et al. |
| 5,748,254 A | 5/1998 | Harrison et al. |
| 5,768,539 A | 6/1998 | Metz et al. |
| 5,778,187 A | 7/1998 | Monteiro et al. |
| 5,793,410 A | 8/1998 | Rao |
| 5,793,971 A | 8/1998 | Fujita et al. |
| 5,794,217 A | 8/1998 | Allen |
| 5,808,608 A | 9/1998 | Young et al. |
| 5,809,204 A | 9/1998 | Young et al. |
| 5,812,123 A | 9/1998 | Rowe et al. |
| 5,812,124 A | 9/1998 | Eick et al. |
| 5,818,510 A | 10/1998 | Cobbley et al. |
| 5,822,493 A | 10/1998 | Uehara et al. |
| 5,850,218 A | 12/1998 | Lajoie et al. |
| 5,861,881 A | 1/1999 | Freeman et al. |
| 5,872,588 A | 2/1999 | Aras et al. |
| 5,880,768 A | 3/1999 | Lemmons et al. |
| 5,887,243 A | 3/1999 | Harvey et al. |
| 5,914,746 A | 6/1999 | Matthews, III et al. |
| 5,915,068 A | 6/1999 | Levine |
| 5,917,538 A | 6/1999 | Asamizuya |
| 5,929,932 A | 7/1999 | Otsuki et al. |
| 5,940,073 A | 8/1999 | Klosterman et al. |
| 5,945,987 A | 8/1999 | Dunn |
| 5,969,748 A | 10/1999 | Casement et al. |
| 6,002,394 A | 12/1999 | Schein et al. |
| 6,005,603 A | 12/1999 | Flavin |
| 6,008,803 A | 12/1999 | Rowe et al. |
| 6,026,211 A | 2/2000 | Nakamura et al. |
| 6,046,760 A | 4/2000 | Jun |
| 6,052,588 A | 4/2000 | Mo et al. |
| 6,055,358 A | 4/2000 | Traxlmayr |
| 6,065,050 A | 5/2000 | Demoney |
| 6,108,002 A | 8/2000 | Ishizaki |
| 6,115,532 A | 9/2000 | Saeki |
| 6,118,922 A | 9/2000 | Van et al. |
| 6,172,712 B1 | 1/2001 | Beard |
| 6,175,362 B1 | 1/2001 | Harms et al. |
| 6,177,931 B1 | 1/2001 | Alexander et al. |
| 6,181,333 B1 | 1/2001 | Chaney et al. |
| 6,215,530 B1 | 4/2001 | Wasilewski |
| 6,233,389 B1 | 5/2001 | Barton et al. |
| 6,249,320 B1 | 6/2001 | Schneidewend et al. |
| 6,253,375 B1 | 6/2001 | Gordon et al. |
| 6,314,572 B1 | 11/2001 | Larocca et al. |
| 6,324,338 B1 | 11/2001 | Wood et al. |
| 6,442,328 B1 | 8/2002 | Elliott et al. |
| 6,442,332 B1 | 8/2002 | Knudson et al. |
| 6,493,876 B1 | 12/2002 | Defreese et al. |
| 6,532,593 B1 | 3/2003 | Moroney |
| 6,543,053 B1 | 4/2003 | Li et al. |
| 6,609,253 B1 | 8/2003 | Swix et al. |
| 6,665,869 B1 | 12/2003 | Ellis et al. |
| 6,772,433 B1 | 8/2004 | Lajoie et al. |
| 6,792,616 B1 | 9/2004 | Jerding et al. |
| 6,820,265 B1 | 11/2004 | Stamper et al. |
| 6,931,657 B1 | 8/2005 | Marsh |
| 7,028,329 B1 | 4/2006 | Mizutani |
| 7,073,189 B2 | 7/2006 | McElhatten et al. |
| 7,174,126 B2 | 2/2007 | McElhatten et al. |
| 7,240,359 B1 | 7/2007 | Sie et al. |
| 7,380,029 B2 | 5/2008 | Plourde, Jr. et al. |
| 7,409,140 B2 | 8/2008 | Rodriguez et al. |
| 7,602,820 B2 | 10/2009 | Helms et al. |
| 7,663,700 B2 | 2/2010 | Yuen et al. |
| 7,694,319 B1 | 4/2010 | Hassell et al. |
| 7,810,121 B2 | 10/2010 | Patel et al. |
| 8,230,343 B2 | 7/2012 | Logan et al. |
| 8,341,242 B2 | 12/2012 | Dillon et al. |
| 8,359,616 B2 | 1/2013 | Rosenberg et al. |
| 8,539,503 B2 | 9/2013 | Homma et al. |
| 8,843,963 B2 | 9/2014 | Boylan et al. |
| 9,071,795 B2 | 6/2015 | McElhatten et al. |
| 9,886,177 B2 | 2/2018 | Lee et al. |
| 9,948,962 B2 | 4/2018 | Nielsen et al. |
| 2001/0047516 A1 | 11/2001 | Swain et al. |
| 2002/0013948 A1 | 1/2002 | Aguayo et al. |
| 2002/0042914 A1 | 4/2002 | Walker et al. |
| 2002/0056087 A1 | 5/2002 | Berezowski et al. |
| 2002/0078449 A1 | 6/2002 | Gordon et al. |
| 2002/0078466 A1 | 6/2002 | Beyda |
| 2002/0150387 A1 | 10/2002 | Kunii et al. |
| 2002/0174430 A1 | 11/2002 | Ellis et al. |
| 2002/0174433 A1 | 11/2002 | Baumgartner et al. |
| 2002/0174438 A1 | 11/2002 | Cleary et al. |
| 2002/0175998 A1 | 11/2002 | Hoang |
| 2002/0178447 A1 | 11/2002 | Plotnick et al. |
| 2002/0191950 A1 | 12/2002 | Wang |
| 2003/0005457 A1 | 1/2003 | Faibish et al. |
| 2003/0046695 A1 | 3/2003 | Billmaier et al. |
| 2003/0149988 A1 | 8/2003 | Ellis et al. |
| 2003/0188317 A1 | 10/2003 | Liew et al. |
| 2003/0194200 A1 | 10/2003 | Yuen et al. |
| 2004/0015986 A1 | 1/2004 | Carver et al. |
| 2004/0226042 A1 | 11/2004 | Ellis |
| 2004/0226044 A1 | 11/2004 | Goode |
| 2004/0250279 A1 | 12/2004 | Billmaier et al. |
| 2004/0255336 A1 | 12/2004 | Logan et al. |
| 2004/0261098 A1 | 12/2004 | Macrae et al. |
| 2005/0015355 A1 | 1/2005 | Heller et al. |
| 2005/0044577 A1 | 2/2005 | Jerding et al. |
| 2005/0050579 A1 | 3/2005 | Dietz et al. |
| 2005/0097599 A1 | 5/2005 | Plotnick et al. |
| 2005/0138546 A1 | 6/2005 | Abiezzi |
| 2005/0283800 A1 | 12/2005 | Ellis et al. |
| 2006/0288366 A1 | 12/2006 | Boylan et al. |
| 2007/0044121 A1 | 2/2007 | Parekh et al. |
| 2007/0094689 A1 | 4/2007 | McElhatten et al. |
| 2007/0199030 A1 | 8/2007 | Ellis et al. |
| 2008/0188213 A1 | 8/2008 | Mankovitz |
| 2010/0257561 A1 | 10/2010 | Maissel et al. |
| 2011/0035775 A1 | 2/2011 | Patel et al. |
| 2011/0093900 A1 | 4/2011 | Patel et al. |
| 2011/0103374 A1 | 5/2011 | Lajoie et al. |
| 2011/0126246 A1 | 5/2011 | Thomas et al. |
| 2012/0017245 A1* | 1/2012 | Chen ................ H04N 21/25825 725/54 |
| 2012/0151528 A1 | 6/2012 | Mathews et al. |
| 2012/0173356 A1 | 7/2012 | Fan et al. |
| 2013/0007260 A1 | 1/2013 | Jain et al. |
| 2013/0318560 A1 | 11/2013 | Cholas et al. |
| 2015/0181260 A1 | 6/2015 | Mittal et al. |
| 2015/0201235 A1 | 7/2015 | Ellis et al. |
| 2015/0281795 A1 | 10/2015 | McElhatten et al. |

FOREIGN PATENT DOCUMENTS

| | | |
|---|---|---|
| EP | 0725539 A2 | 8/1996 |
| EP | 0735750 A2 | 10/1996 |
| EP | 0758833 A2 | 2/1997 |
| EP | 0790738 A2 | 8/1997 |
| EP | 1087619 A1 | 3/2001 |
| GB | 2217144 A | 10/1989 |

(56) References Cited

FOREIGN PATENT DOCUMENTS

| | | |
|---|---|---|
| GB | 2232031 A | 11/1990 |
| GB | 2264409 A | 8/1993 |
| WO | WO-9000847 A1 | 1/1990 |
| WO | WO-9013204 A1 | 11/1990 |
| WO | WO-9015507 A1 | 12/1990 |
| WO | WO-9414284 A1 | 6/1994 |
| WO | WO-9511567 A1 | 4/1995 |
| WO | WO-9528055 A1 | 10/1995 |
| WO | WO-9528799 A1 | 10/1995 |
| WO | WO-9530302 A1 | 11/1995 |
| WO | WO-9531069 A1 | 11/1995 |
| WO | WO-9532583 A1 | 11/1995 |
| WO | WO-9532584 A1 | 11/1995 |
| WO | WO-9532587 A1 | 11/1995 |
| WO | WO-9609721 A1 | 3/1996 |
| WO | WO-9612371 A1 | 4/1996 |
| WO | WO-9613932 A1 | 5/1996 |
| WO | WO-9627982 A1 | 9/1996 |
| WO | WO-9637999 A1 | 11/1996 |
| WO | WO-9641472 A1 | 12/1996 |
| WO | WO-9704595 A1 | 2/1997 |
| WO | WO-9713368 A1 | 4/1997 |
| WO | WO-9718673 A1 | 5/1997 |
| WO | WO-9718675 A1 | 5/1997 |
| WO | WO-9727705 A1 | 7/1997 |
| WO | WO-9730547 A1 | 8/1997 |
| WO | WO-9730552 A1 | 8/1997 |
| WO | WO-0011871 A1 | 3/2000 |
| WO | WO-0052928 A1 | 9/2000 |
| WO | WO-0054506 A1 | 9/2000 |
| WO | WO-0156285 A1 | 8/2001 |
| WO | WO-0195610 A1 | 12/2001 |
| WO | WO-0195621 A1 | 12/2001 |
| WO | WO-2014058233 A1 | 4/2014 |

OTHER PUBLICATIONS

Advanced Television Systems Committee: Program Guide for Digital Television ATSC Standard, Jan. 3, 1996.
Brugliera V., "Digital On-Screen Display: A New Technology for the Consumer Interface," Symposium Record, Cable Sessions, 18th International Television Symposium and Technical Exhibition, Montreux, Switzerland, pp. 571-586, June 10-15.
Buss, "Ultra TV", Brandmarketing, Sep. 1999, vol. VI, No. 9, p. 74, ISSN 1091-6962, 1999 Responsive Database Services, Inc. Business and Industry; 1999 Fairchild Publications.
European Telecommunications Standards Institute: Specification for Service Information (SI) in Digital Video Broadcasting (DVB) Systems, Oct. 1995.
Flynn, et al., "Interactive TV, CNNFn", transcipt #00081407FN-111 interview Josh Bernoff, Digital Jam, Aug. 14, 2000.
Furchgott, "Don't want people to control their T.V.s?", The New York Times, Aug. 24, 2000, Section G, p. 1, col. 2, Circuits, 2000 The New York Times Company.
Future VOD role of studios vs. other companies debated, Video Week, Apr. 10, 2000, section: This Week's News, 2000 Warren Publishing, Inc.
Gunther, et al., "When technology attacks!; Your T.V. is looking weird. Network executives are getting flustered. Viewing choices are exploding. That's what happens . . . ", Fortune, Mar. 6, 2000, section: Features/Television, p. 152, 2000 Time Inc.
"Independent study shows TiVo service increases enjoyment and changes people's attitudes towards T.V.", PR Newswire, May 2, 2000, 2000 FT Asia Intelligence Wire; 2000 PR Newswire.
Kale, RFC 1180 "A TCP/IP tutorial", Jan. 1991, Spider Systems Limited, Section 4 "ARP".
Larsen, Peter Thal, "Inside Track: TV viewers can box clever: Technology Video Recorders: personal video reorders will be a godsend for viewers. But what about the schedulers", Financial Times London Ed., Jun. 23, 2000, p. 18, ISSN 0307-1766, 2000 Responsive Database Services, Inc. Business and Industry; 2000 Financial Times Ltd.
Lowry, Television, as you like it; Today's gadgetry is smart enough to let viewers choose camera angles, or kick back and rewind as the action unfolds live. Watch it, and it watches back, Los Angeles Times, Feb. 13, 2000, section: Calendar, p. 8, Calendar Desk, 2000 Times Mirror Company.
Miller D.M., "A Scenario for the Deployment of Interactive Multimedia Cable Television Systems in the United States in the 1990's," Proceedings of the IEEE, 1994, vol. 82 (4), pp. 585-589.
"More 'convergence' digital video recorders emerge", Video Week, Jun. 19, 2000, section: This Week's News, 2000 Warren Publishing, Inc.
"Multiplying Video Mixer," NTIS Tech Notes, p. 135, Feb. 1990.
"PVR copyright concerns raised", Audio Week, Aug. 23, 1999, section: This Week's News, 1999 Warren Publishing, Inc.
Ramakrishnan, et al., Operating System Support for a Video-On-Demand File Service, Digital Equipment Corporation, 1995, p. 4 ("CMFAP").
Sabga, et al., "TiVo—CEO, CNNfn", transcript # 000901 10FN-107 interview Michael Ramsay, The N.E.W. Show, Sep. 1, 2000, Fri. 5:18 p.m. EST, 2000 Cable News Network.
Snoddy, "The TiVo—T.V.'s nemesis?", Times Newspapers Ltd., Sep. 1, 2000, section: Features, 2000 Times Newspapers Limited (the Times London).
"TiVo and replay sign cable deals to boost PVR distribution", Warren's Cable Regulation Monitor, Aug. 21, 2000, section: This Week's News, 2000 Warren Publishing, Inc.

\* cited by examiner

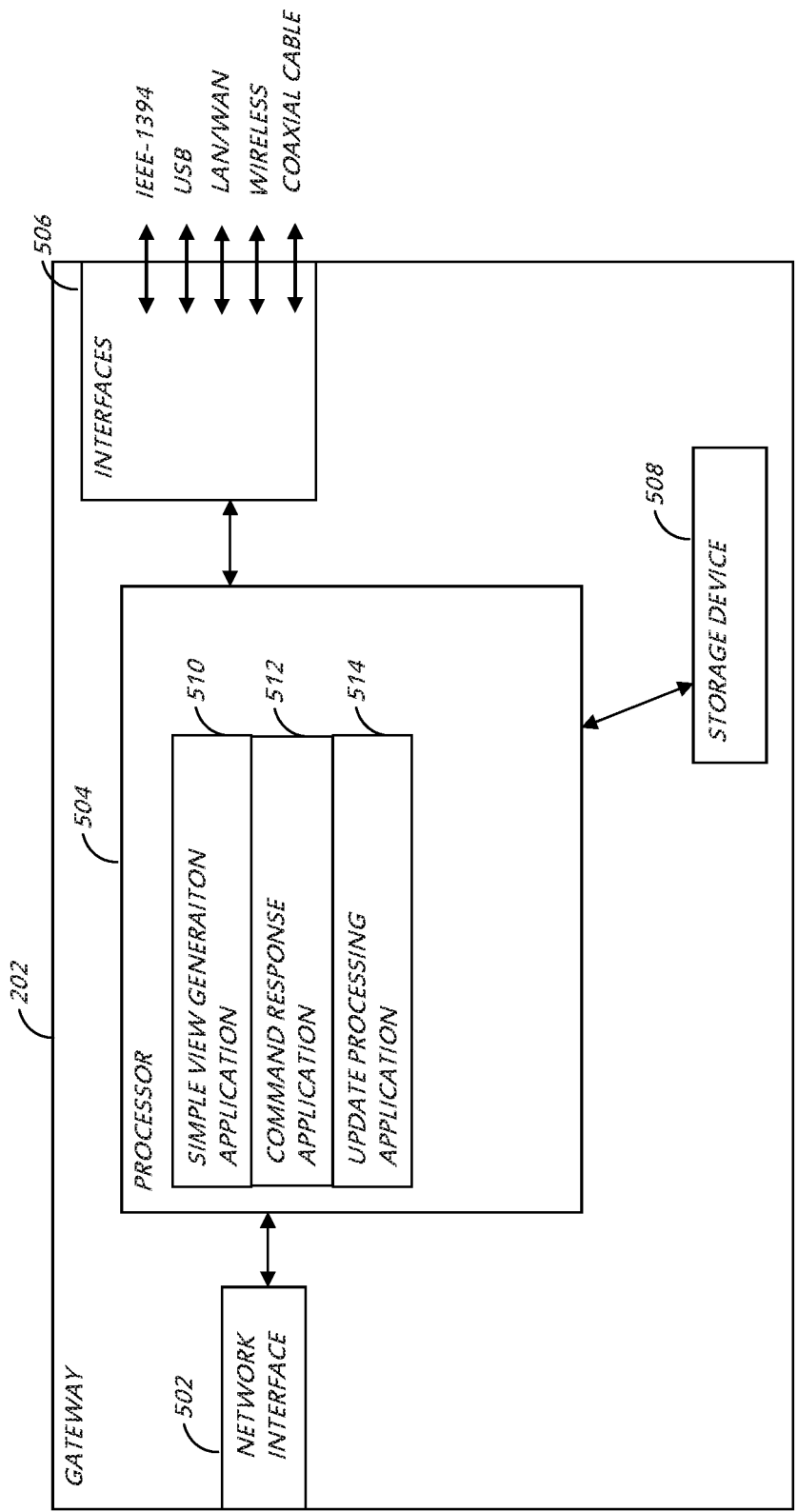

APPARATUS AND METHODS FOR EFFICIENT DELIVERY OF ELECTRONIC PROGRAM GUIDE DATA

PRIORITY AND RELATED APPLICATIONS

This application is a continuation of and claims the benefit of priority to U.S. patent application Ser. No. 15/954,478 of the same title filed on Apr. 16, 2018, issuing as U.S. Pat. No. 10,567,814 on Feb. 18, 2020, which is a continuation of and claims the benefit of priority to U.S. patent application Ser. No. 14/541,035 of the same title filed on Nov. 13, 2014 issuing as U.S. Pat. No. 9,948,962 on Apr. 17, 2018, which is incorporated herein by reference in its entirety. The present disclosure is also related to U.S. Pat. No. 6,772,433 issued on Aug. 3, 2004 and entitled "INTERACTIVE PROGRAM GUIDE FOR DESIGNATING INFORMATION ON AN INTERACTIVE PROGRAM GUIDE DISPLAY" and to U.S. Pat. No. 7,073,189 issued on Jul. 4, 2006 and entitled "PROGRAM GUIDE AND RESERVATION SYSTEM FOR NETWORK BASED DIGITAL INFORMATION AND ENTERTAINMENT STORAGE AND DELIVERY SYSTEM", each of the foregoing are incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of Invention

The disclosure relates generally to the field of data and content delivery. In one exemplary aspect, the disclosure relates to apparatus and methods for efficient delivery of electronic program data.

2. Description of Related Technology

Recent advances in digital information processing and technology have made a whole range of services and functions available for delivery to consumers at their premises for very reasonable prices or subscription fees. These services and functions include digital content or programming (movies, etc.), digital video-on-demand (VOD), personal video recorder (PVR) and networked PVR (nPVR), Internet Protocol television (IPTV), digital media playback and recording, as well high speed Internet access and IP-based telephony (e.g., VoIP). Other services available to network users include access to, and recording of, digital music (e.g., MP3 files), as well as local area networking (including wire-line and wireless local area networks) for distributing these services throughout the user's premises, and beyond. Network-delivered or network-based gaming and applications ("apps") have also each recently come to the forefront as popular content areas for subscribers.

In order to assist a subscriber in navigating this myriad of deliverable content, electronic guides are available. Modern electronic program guides and interactive program guides (collectively "EPGs") provide menus that present broadcast programming or scheduling information for current and upcoming programming. EPG commonly are used in television systems to enable a user to view information relating to broadcast content.

An interactive EPG enables a user to interact with the presented guide data. User interactions may include navigation of the menus, selection of content, and scheduling a recording or viewing using a remote control apparatus, keyboard, or other means of input.

In many current systems, data necessary to create an EPG is delivered to each device by content distributors and/or vendors. The data may be delivered via in-band or out-of-band signaling. The client devices then use the information to build the entire EPG. Alternatively, the EPG may be generated at a network or cloud entity and delivered to the devices (including delivery of updates relating thereto).

Each of the above-described scenarios suffers from inefficiency. For example, in the instance the entire EPG is built at the client device, significant bandwidth and other resources must be dedicated to the data delivery and delivery of updates. In addition, the client devices themselves must comprise sufficient internal processing resources in order to piece together the EPG, and additionally update the EPG with each data update. Network resources and bandwidth are also used to provide the compiled EPG to the devices as discussed above. Moreover, the foregoing methods both require a significant amount of wasted resources attributable to the steady influx of data requests from the devices (such as for EPG data and/or for the completed EPG, and updates to each).

Therefore, what are needed are methods and apparatus for a more efficient delivery of electronic program guide data. Ideally, the improved methods and apparatus would alleviate the significant burden on resources which the current systems create and increase overall efficiency of the EPG system.

SUMMARY

The present disclosure addresses the forgoing needs by providing, inter alia, apparatus and methods for efficient delivery of electronic program guide data.

In one aspect of this present disclosure, a computerized method for delivering electronic program guide (EPG) data over a content distribution network is disclosed. In one embodiment thereof, the computerized method includes: accessing the EPG data from a computerized network entity configured to be in data communication with the content distribution network; accessing data to enable determination of at least one capability of a computerized client device configured to be in data communication with the content delivery network; based on the at least one capability of the computerized client device not meeting at least one criterion, generating a first static representation of the EPG data based on at least a first portion of the accessed EPG data; and transmitting the generated first static representation to the computerized client device, thereby enabling the computerized client device to cause rendering of the first static representation.

In one variant thereof, the first static representation is implemented to reduce an amount of computing resources required to be used by the computerized client device relative to a non-static representation.

In another aspect of the present disclosure, a computerized network apparatus disposed in a content delivery network is disclosed. In one embodiment thereof, the computerized network apparatus includes: a processor apparatus implemented to be in data communication with at least a server and one or more client devices; and a non-transitory storage apparatus in data communication with the processor apparatus and including a storage medium implemented to store a computer program thereon, the at least one computer program including a plurality of instructions. In one variant thereof, the plurality of instructions are implemented to, when executed by the processor apparatus, cause the network apparatus to: retrieve guide data from the server; access data to enable determination of at least one capability of a computerized client device; and based at least on the at least one capability of the computerized client device not meeting at least one criterion, generate a first static representation of the guide data, and enable rendering of the first static representation at the computerized client device.

In one implementation thereof, the rendering of the first static representation is associated with reduced usage of computing resources by the computerized client device relative to a non-static representation.

In another aspect of the present disclosure, a networked apparatus is disclosed. In one embodiment thereof, the networked apparatus includes means means for accessing guide data from a server device; means for determining at least one capability of a client device; means for generating a first static representation of the guide data based on the at least one capability of the client device not meeting at least one criterion; and means for delivering the generated first static representation to the client device.

In one variant thereof, the first static representation is displayable via the client device.

In another variant thereof, the generation of the first static representation by the networked apparatus enables a reduction of an amount of computing resources used by the client device relative to a non-static representation.

These and other aspects of the disclosure shall become apparent when considered in light of the disclosure provided herein.

BRIEF DESCRIPTION OF THE DRAWINGS

FIG. 5 is a functional block diagram illustrating an exemplary gateway device for use with the present disclosure.

Figure 1:
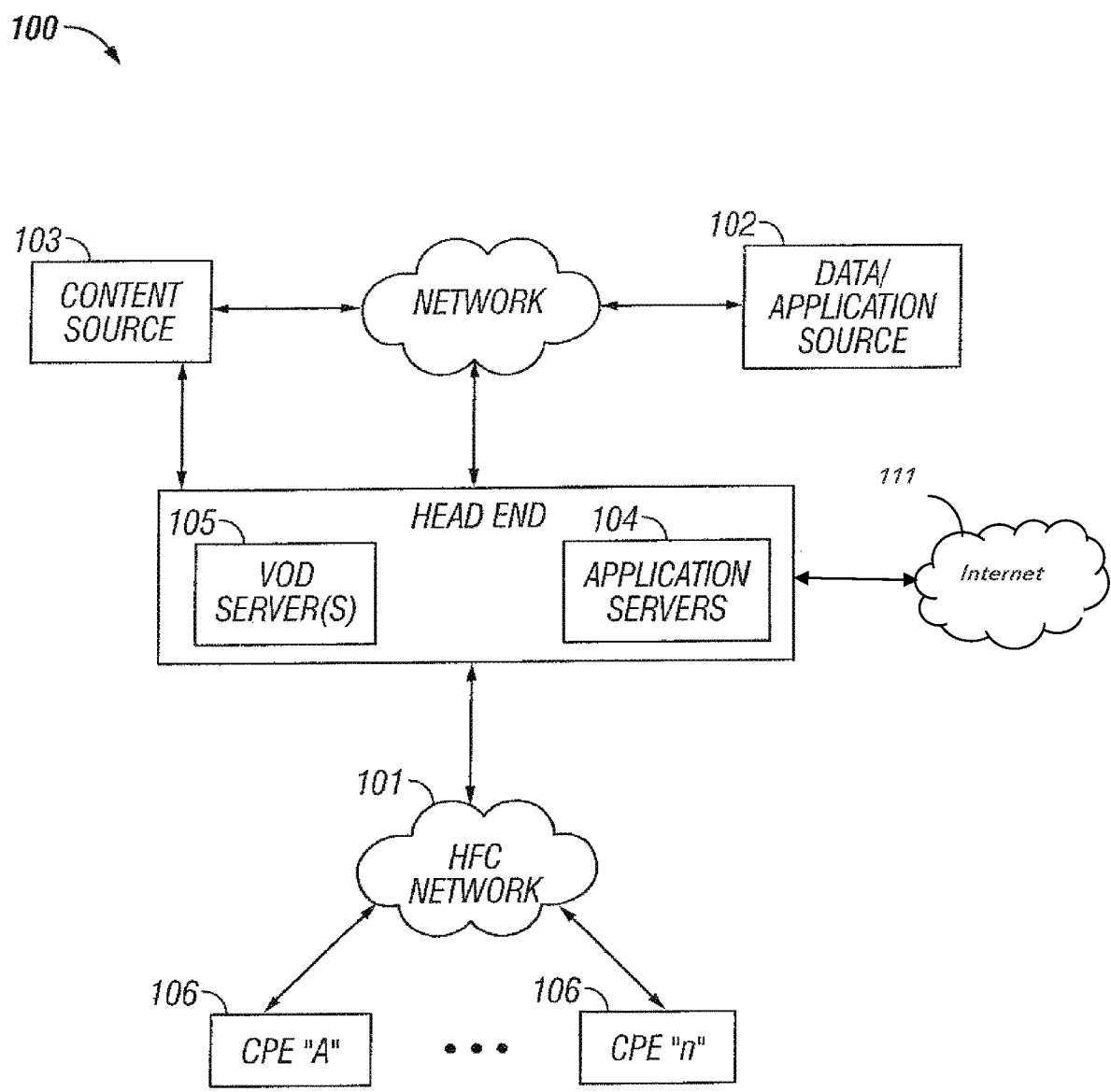
FIG. 1 is a functional block diagram illustrating an exemplary hybrid fiber/coax (HFC) cable network configuration useful with the present disclosure.

All Figures© Copyright 2014 Time Warner Cable Enterprises LLC. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, tablets, PDAs, personal media devices (PMDs), tablets, and smartphones.

As used herein, the terms "cloud" and "cloud device" refer to computing resources residing in a network outside of the subscriber network. These resources include software and information are generally accessible over the Internet or other means of communication with other computers, data storage, or other devices.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the terms "computer program," "software," or "software application" are meant to include any sequence or human or machine cognizable steps which perform a function. Such program may be rendered in virtually any programming language or environment including, for example and without limitation, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "consumer premises equipment" (CPE) and "consumer device" refer without limitation to any type of electronic equipment for use within a consumer's or user's premises and connected to a content distribution network. The term "consumer device" includes terminal devices that have access to digital television content via a satellite, cable, or terrestrial network. The term "consumer premises equipment" (CPE) includes such electronic equipment such as set-top boxes (e.g., DSTBs or IPTV devices), televisions, cable modems (CMs), embedded multimedia terminal adapters (eMTAs), whether stand-alone or integrated with other devices, digital video recorders (DVR), gateway storage devices, and ITV personal computers.

As used herein, the term "DOCSIS" refers to any of the existing or planned variants of the Data Over Cable Services Interface Specification, including for example DOCSIS versions 1.0, 1.1, 2.0 and 3.0.

As used herein, the terms "electronic program guide" and "interactive program guide" (collectively "EPG") are used interchangeably to refer to lists, menus, buttons, graphics, navigation icons, and other elements displayed to the user that present information regarding content including broadcast programming and/or scheduling information relating to the content such as current and upcoming broadcasts over television and other media. These elements may be static, animated, and/or interactive.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the term "network" refers generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., LTE/LTE-A, 3GPP, 3GPP2, UMTS), or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers without limitation to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers), or the resources shared by them in the form of for example entire cable RF signal, only the RF channels used to receive the service or otherwise treated as a single logical unit by the network for resource assignment.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present disclosure provides methods and apparatus for efficiently delivering electronic program guide (EPG) data to consumer devices. The provided methods and apparatus address the prior art deficiencies associated with certain types of client devices having limited processing power, as well as limited network bandwidth available for delivering EPG data and updates. The disclosed methods and implementations thereof thus reduce resource usage while providing a rich user experience.

In one aspect of the present disclosure, the EPG data is pre-rendered prior to delivery to a client device. For example, a gateway apparatus within a user's premises and in communication with the client device (such as via a home network) may receive EPG data and pre-render the guide on behalf of the client device. The gateway apparatus serves as a proxy between the client device and the network, and renders the received guide data before delivering it in a format that requires little or no processing at the client-side. The foregoing mechanisms further decrease an amount of network bandwidth required for rendering the EPG in that only one device within a premises (the gateway) will receive the guide data, rather than all of the clients individually requesting and receiving the EPG data.

The pre-rendering which occurs at the gateway may, in one exemplary embodiment comprise generation of a simple view representing various ones of the EPG screens. The so-called simple view may comprise one of: a video segment (e.g., MP4, MPEG), a still image (e.g., PNG, JPG, TIFF), and/or a pointer (e.g., simple HTML, and other immediately renderable formats).

To achieve the efficiency sought by the present disclosure, a complete set of all available guide data is received by the gateway from a network server, reducing or removing the need to continually request views from the network either by the gateway or each of the individual client devices which will ultimately have access to the EPG. In an exemplary embodiment, the gateway may request additional data or updates if the guide data is insufficient (due to, e.g., a new user input or passage of time). Delivery of simple views to the CPE may be performed all at once, so that the CPE receives every possible simple view it may require. In another exemplary embodiment, delivery may be done predictively. For example, the gateway may provide only the simple view that is in an appropriate format for a given device to that device and/or based on user inputs and interaction with the previous screen. In addition, the gateway may prioritize which next screens to generate based on a user's actions (e.g., moving a cursor to a dialog option) or an EPG screen (previously generated by the gateway) having multiple possible selections. Such predictions allow a fast, smooth, and rich user experience. Certain predictive implementations may further minimize bandwidth usage.

Detailed Description of Exemplary Embodiments

Exemplary embodiments of the apparatus and methods of the present disclosure are now described in detail. While these exemplary embodiments are described in the context of the aforementioned hybrid fiber/coax (HFC) cable system architecture having an multiple systems operator (MSO), digital networking capability, IP delivery capability, and plurality of client devices or CPEs, the general principles and advantages of the disclosure may be extended to other types of networks and architectures, whether broadband, narrowband, wired or wireless, or otherwise, the following therefore being merely exemplary in nature.

Also, while certain aspects are described primarily in the context of the well-known IP or Internet Protocol (described in, inter alia, RFC 791 and 2460) and associated transport control protocol (TCP), it will be appreciated that the present disclosure may utilize other types of packetization and transport protocols to implement the described functionality It will also be appreciated that while described generally in the context of a consumer (i.e., home) end user domain, the present disclosure may be readily adapted to other types of environments (e.g., commercial/enterprise, government/military, etc.) as well. A myriad of other applications is possible.

Other features and advantages of the present disclosure will immediately be recognized by persons of ordinary skill in the art with reference to the attached drawings and detailed description of exemplary embodiments as given below.
Network—

FIG. 1 illustrates an exemplary distribution network configuration with which the apparatus and methods of the present disclosure may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications enter the network system. Distribution servers are well known in the networking arts, and accordingly not described further herein.

The VOD server 105 comprises a computer system where on-demand content is received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that may be accessed by a distribution server 104.

Figure 1A:
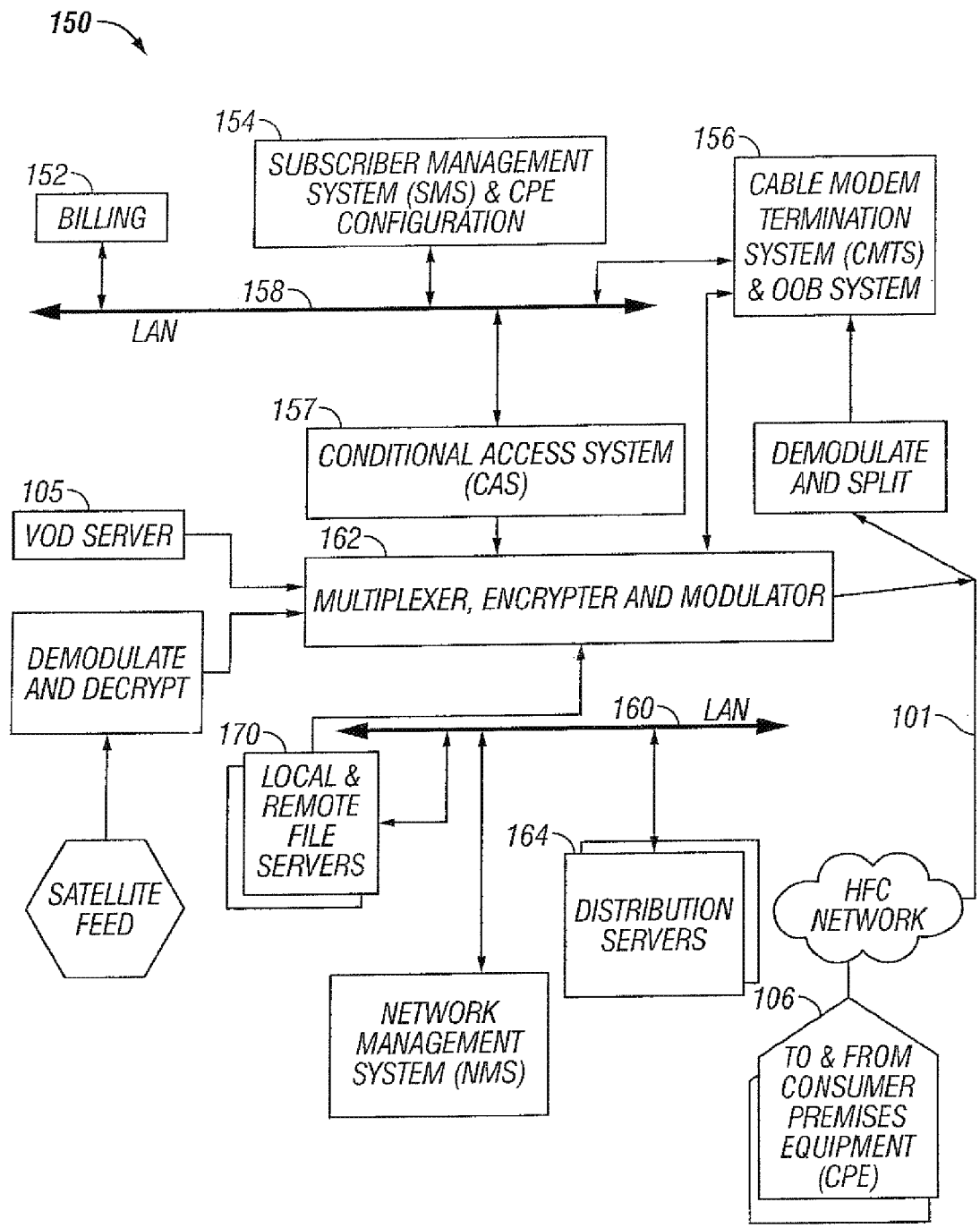
FIG. 1a is a functional block diagram illustrating one exemplary HFC cable network headend configuration useful with the present disclosure.

Referring now to FIG. 1a, one exemplary embodiment of a headend architecture useful with the present disclosure is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub. As yet another alternative, a multi-location or multi-stage approach may be used, such as that described in co-owned U.S. Pat. No. 7,602,820, entitled "APPARATUS AND METHODS FOR MULTI-STAGE MULTIPLEXING IN A NETWORK" incorporated herein by reference in its entirety, which discloses, inter alia, improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the disclosure is in no way limited to these approaches.

It will also be recognized that the multiple servers (broadcast, VoD, or otherwise) may be used, and disposed at two or more different locations if desired, such as being part of different server "farms". These multiple servers may be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Local Intermediary Service Nodes—

Figure 1B:
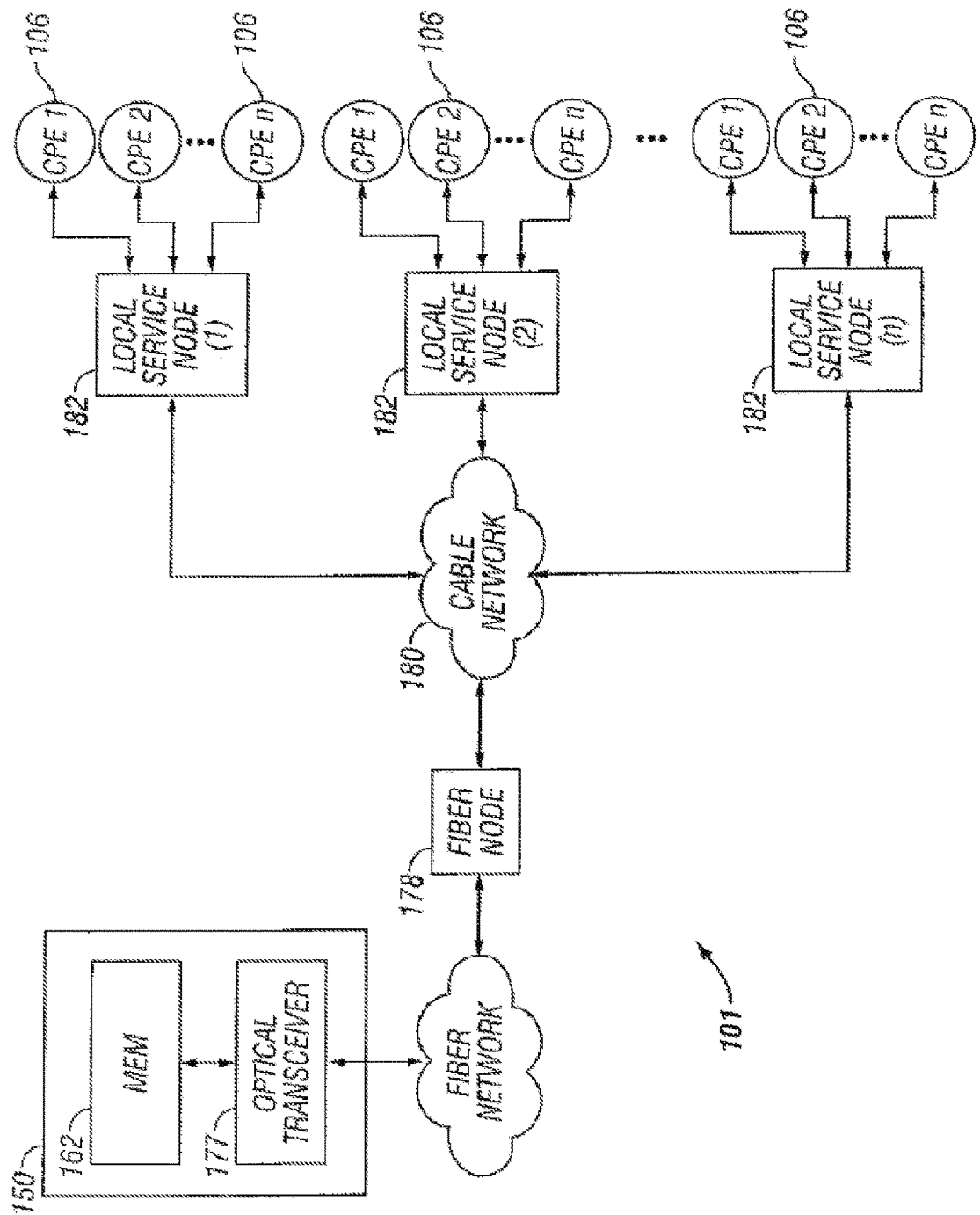
FIG. 1b is a functional block diagram illustrating one exemplary local service node configuration useful with the present disclosure.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

In addition to on-demand and broadcast content (e.g., video programming), the system of FIGS. 1a and 1b (and 1c discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOC SIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1c.

The CPE 106 are each configured to monitor the particular assigned RF channel (such as via a port or socket ID/address, or other such mechanism) for IP packets intended for the subscriber premises/address that they serve.

"Packetized" Networks—

Figure 1C:
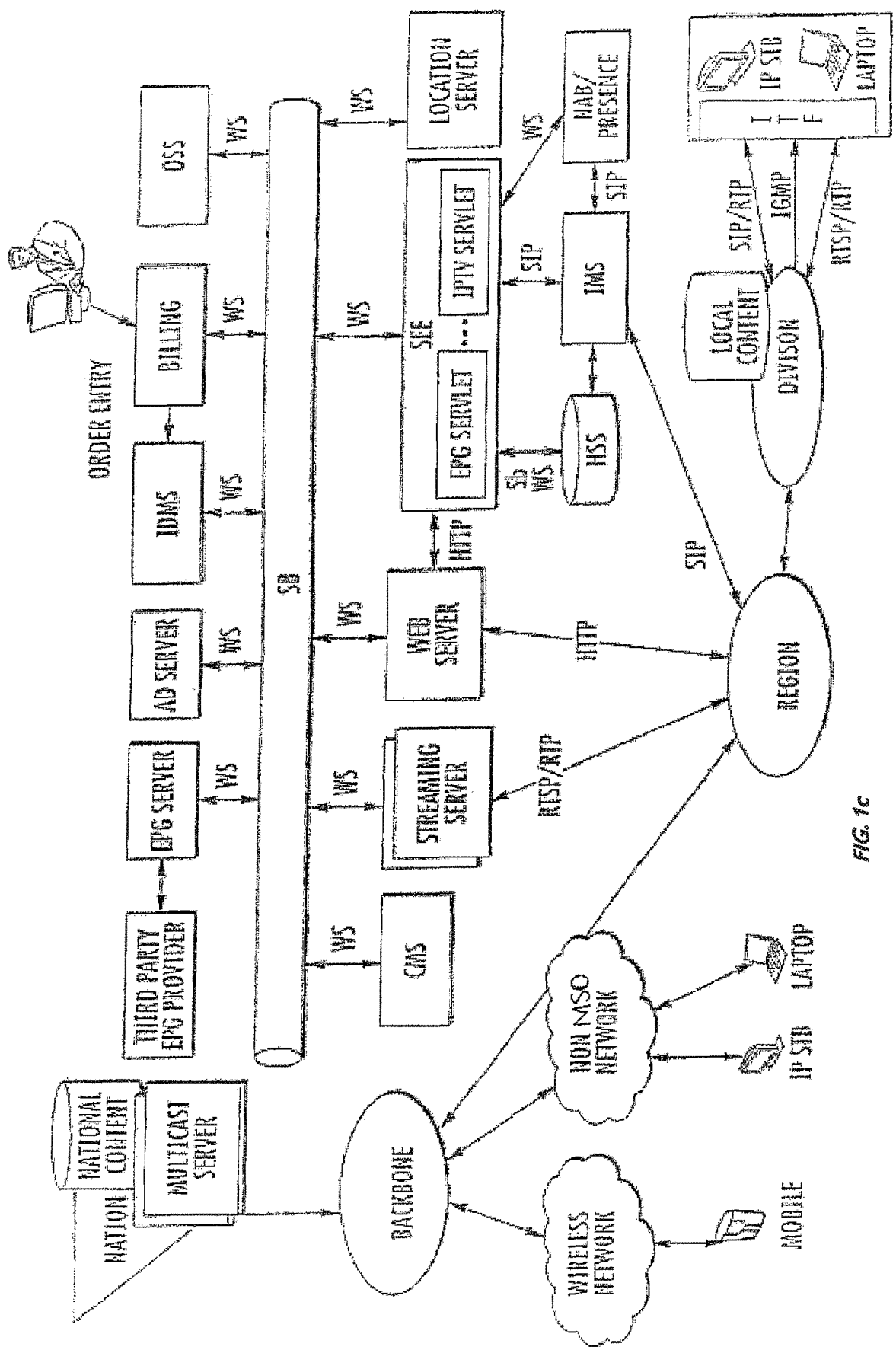
FIG. 1c is a functional block diagram illustrating one exemplary packetized content delivery network architecture useful with the present disclosure.

While the foregoing network architectures described herein may (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present disclosure, a "packet optimized" delivery network is used for carriage of the packet content (e.g., IPTV content). FIG. 1c illustrates one exemplary implementation of such a network, in the context of a 3GPP IMS (IP Multimedia Subsystem) network with common control plane and service delivery platform (SDP), as described in co-owned U.S. patent application Ser. No. 12/764,746, filed on Apr. 21, 2010, entitled "METHODS AND APPARATUS FOR PACKETIZED CONTENT DELIVERY OVER A CONTENT DELIVERY NETWORK, published as U.S. Patent Application Publication No. 2011-0103374 on May 5, 2011, issued as U.S. Pat. No. 10,264,029 on Apr. 16, 2019, and incorporated herein by reference in its entirety. Such a network provides significant enhancements in terms of, inter alia, common control of different services, implementation and management of content delivery sessions according to unicast or multicast models, etc.; however, it is appreciated that the various features of the present disclosure are in no way limited to any of the foregoing architectures.

Guide Data Delivery—

In the field of data and content delivery, there are ways to interpret and render EPG applications by implementing technologies such as HTML5 and JavaScript. Currently, content vendors implement partial rendering of HTML pages in the cloud, i.e., shared computing resources from outside the client device. Other providers use cloud-based rendering for only their guide application at a basic level. However, cloud rendering of an EPG application is inefficient.

It would be desirable to implement the foregoing technology at the consumer device. However, the challenge of doing so is the high unit cost of the "consumer premises equipment" (CPE) due to bandwidth usage, processing power, and memory footprint. Typically, when a scripted application like an HTML5 navigator is used in a home with multiple set-top boxes (STBs) or other "consumer premises equipment," a significant amount of inefficient data, such as uncompressed text, is delivered redundantly to each CPE. In addition, each CPE device must have the processing power and memory to fully interpret and render the scripted application in its entirety. The cost of redundant scripted applications running in a home are high with respect to bandwidth and other resources used, and with respect to the cost of the CPEs (processing power and memory footprint).

For example, the partial "cloud" rendering of HTML pages does not rely on a home gateway, so the rendering cannot be done in the home. This requires a remarkable consumption of access network bandwidth because all graphics are rendered in the cloud to a basic level, and all key presses and line-draws are individualized and delivered to each CPE. This is a particular challenge and not an optimal solution for homes with many CPEs or client devices using the same scripted application.

Nonetheless, these partial solutions still require significant burden on CPEs, including processing power and a remarkable consumption of bandwidth. It would be desirable to maintain the quality and rich user-end experience while making the rendering of scripted technologies more efficient and specialized.

As described, a significant competitive challenge presently faced by operators of content delivery networks relates to managing and conserving bandwidth. Therefore, there is a need for new techniques that facilitate reducing the cost of redundant scripted applications running in a home or other locations receiving data to multiple CPEs. These new techniques should reduce the amount of bandwidth used as well as hardware requirements such as processing and memory power and memory while integrating with existing network infrastructures. Various embodiments of the methods and apparatus for providing efficient delivery of guide data are discussed herein.

Exemplary Network Architectures—

Figure 2:
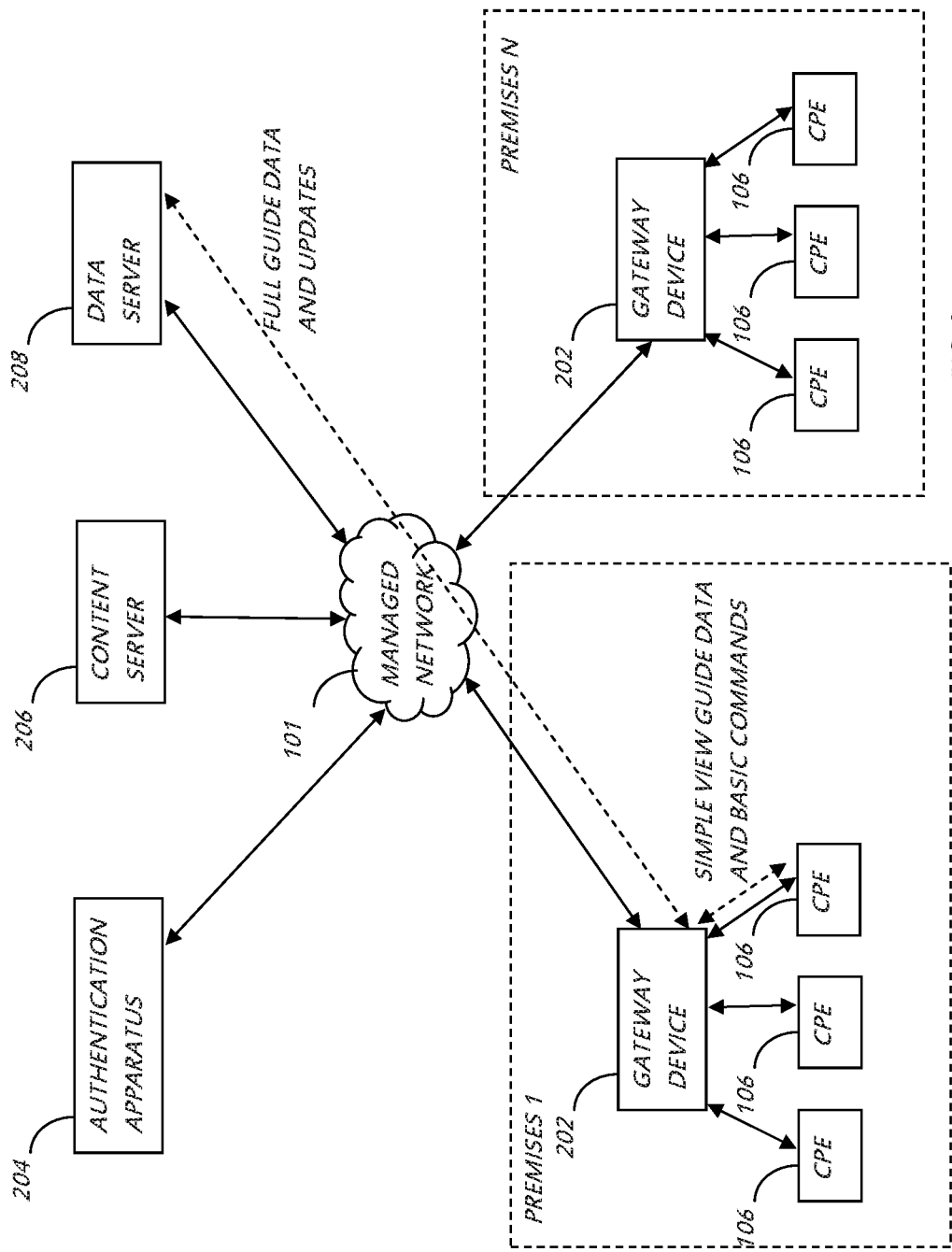
FIG. 2 is a functional block diagram illustrating one exemplary embodiment of a network configuration for providing guide data according to the present disclosure.

Referring now to FIG. 2, an exemplary embodiment of a network architecture 200 for efficiently providing guide data to a plurality of subscriber devices is illustrated. While described herein in the context of a hybridized (i.e., fiber and wireline conductor such as coaxial cable) extant network topology such as that of FIGS. 1-1c discussed above), the present disclosure is in no way so limited, and in fact may be utilized within various network or topology types.

As shown, the network 200 generally comprises a gateway apparatus 202 in communication with a plurality of consumer devices (or CPE) 106. The gateway apparatus 202 in the illustrated embodiment, communicates with a plurality of entities at a managed network 101 to provide content and/or data to the consumer devices 106.

In one variant, the present disclosure enables the gateway 202 to act as a proxy for the CPE 106 with respect to only the guide data. The CPE 106 are, in this embodiment, configured to request and receive content directly from the network 101 without utilizing the gateway 202. However, it is appreciated that in another variant the gateway 202 may additionally act as a proxy for the CPE 106 with respect to delivery of other content and/or data. For example, the gateway apparatus 202 may be similar to that discussed in co-owned U.S. patent application Ser. No. 13/888,210 filed on May 6, 2013, published as U.S. Patent Application Publication No. 2013/0318560 on Nov. 28, 2013, issued as U.S. Pat. No. 8,949,919 on Feb. 3, 2015, and entitled "PREMISES GATEWAY APPARATUS AND METHODS FOR USE IN A CONTENT-BASED NETWORK", which is incorporated herein by reference in its entirety. As discussed therein, a gateway apparatus (such as the gateway apparatus 202) is provided for unifying at least portions of the functionality of a set-top box (STB) or similar customer premises device, or a digital video recorder (DVR), with those of another device such as a cable modem. In one exemplary variant, the out-of-band signaling and communication functions typically necessary on STBs and DVRs are obviated in favor of the premises services gateway (PSG) device, which acts as a unified proxy for all inbound (downstream) and outbound (upstream) communications with the network. This approach is particularly useful to help reduce a cable provider's capital expenditures in manufacturing customer premises equipment (CPE), since the "proxied" DVR and STB no longer require an OOB tuner, and hence their cost is reduced and simplicity, space efficiency, and even reliability increased.

The exemplary gateway 202 may also be advantageously utilized to consolidate in-band tuner resources as well, thereby further reducing capital costs associated with subscriber premises installations. In one variant, communication between the various entities (e.g., DVR and STB and PSG OOB proxy) is accomplished using IP-based communications. In another variant, client devices that support a cable RF tuner and an IP channel distributed over coaxial cable to the gateway are disclosed. These clients may only implement the IP channel, and therefore receive all video or data information over the IP network only. This reduces the cost of the client devices by removing the tuners and the cable modems from each device.

In other embodiments, one or both of the foregoing DVR and STB are further physically integrated within the premises gateway 202, thereby allowing for a fully unified platform. This unified platform may use a common form factor (i.e., one box), a common coaxial interface to the parent network, common AC power supply, end even common operating system, storage devices, and middleware. Common control and user interface environments may also be utilized, such as where a single "universal" remote is provided to afford control of all STB, tuning and DVR functions. The gateway 202 is also configured to interface with any number of other devices which may be present in the customer's premises, such as e.g., MoCA-based LANs, Ethernet LANs, WiFi LANs, PANs, or even personal media devices (PMDs). The gateway 202 may also act as a router, provide network address translation (NAT) functions, and even act as a DHCP server if so configured. In another aspect, the exemplary gateway 202 embodiments disclosed herein further facilitate the aim of easier movement of content within a "trusted domain" or authorized service domain (ASD) by inter alia unifying multiple devices and functions within a single device.

In yet another embodiment, the gateway 202 further communicates with a non-managed network and thereby enables content and/or data to be obtained from networks other than the managed network (for example content and/or data may be obtained via communication with $3^{rd}$ party entities via the Internet). For example, the gateway apparatus 202 may be similar to that discussed in co-owned U.S. patent application Ser. No. 12/582,619 filed on Oct. 20, 2009, entitled "GATEWAY APPARATUS AND METHODS FOR DIGITAL CONTENT DELIVERY IN A NETWORK", published as U.S. Patent Application Publication No. 2011/0093900 on Apr. 21, 2011, and issued as U.S. Pat. No. 9,027,062 on May 5, 2015, which is incorporated herein by reference in its entirety. As discussed therein, a gateway device (such as the gateway apparatus 202) is disposed at the headend of the network and is configured to request and receive internet content from one or more host servers via the Internet. The internet content is then processed and delivered to one or more client devices (such as the CPE 106).

Processing of internet content at the gateway 202 may include de-encapsulating the received internet content from a first media file container format and subsequently re-encapsulating the internet content to a second media file container format which is compatible with one or more receiving devices. For example, content which is delivered from a host server may be encapsulated in e.g., MP4, if the receiving client device(s) are not capable of reading the MP4 files, the gateway device may re-encapsulate to e.g., MPEG-2 or other format that the receiving device is capable of reading. The gateway device may process received content automatically into various alternative encapsulation formats or, may encapsulate as needed to the format of the specific requesting device. The processed content may be stored for future use for transmission to other client devices requesting the same content in the particular new format.

Multiple alternative delivery paradigms are given for the delivery of internet content from the gateway device to the client devices. In one embodiment, internet content is delivered according to traditional broadcast mechanisms (e.g., linear delivery via downstream in-band QAM). According to this mechanism, the gateway device first establishes a set of rules for requesting certain internet content. The content is then pre-processed, and a broadcast schedule is created. Users may then view the internet content by tuning to the appropriate program channel (associated with one or more particular QAMs) at the time designated in the broadcast schedule.

In another embodiment, internet content is delivered using VOD delivery mechanisms. According to this mechanism, a VOD session is established between the user's CPE 106 and an internet content portal associated with the gateway device. At the portal, the user browses and selects internet content for viewing. The gateway device is then able to request selected internet content from a host server associated with the content, process the content as needed, and stream the (processed) content, via the pre-established session, to the user's CPE. In one variant, the same session is utilized for subsequent internet content requests.

Referring again to FIG. 2, although illustrated as a single gateway 202 for each user premises, it is appreciated that more than one gateway 202 may be provided. For example, a single gateway 202 may be configured to receive guide data from the network, render the guide data into one or more of the various simple views discussed herein, and transmit the simple view to each CPE 106 in the premises. Alternatively, one or more of these tasks may be performed at a separate gateway device 202. In a further variant, the gateway 202 may be located at a cloud or network 101 location. In this manner a single gateway apparatus 202 is able to render guide data for a plurality of CPE 106 such as an entire service group.

The gateway device 202 of FIG. 2 is in communication with a network authentication entity 204, a content server 206 and a data server 208 via the managed network 101. The authentication entity 204 is configured to authenticate the gateway 202 and/or subscriber registered thereto. In a further embodiment, the authentication entity 204 is further configured to authenticate each of the devices (and/or a user thereof) which request access to the content and/or data provided from the network 101. This may occur via a direct communication between the CPE 106 and the authentication entity 204; alternatively, the gateway 202 may act as a proxy for the authentication of the CPE 106 and/or a user thereof.

In one embodiment, apparatus and methods for authorization and/or authentication may be of the type discussed in co-owned U.S. patent application Ser. No. 12/536,724 filed Aug. 6, 2009 and entitled "SYSTEM AND METHOD FOR MANAGING ENTITLEMENTS TO DATA OVER A NETWORK", now issued as U.S. Pat. No. 8,341,242 on Dec. 25, 2012, which is incorporated herein by reference in its entirety. If the requesting device/user is not authorized and/or authenticated, content/data cannot be provided thereto.

"Authentication" as used herein refers generally and without limitation to a determination that a device or user associated with the device (e.g., the CPE 106 and/or gateway 202) is among the devices which may receive content/data, and/or that a user of the requesting device is a subscriber to the network 101 or other entitled user. This may be accomplished by requiring the user to log into the network (such as by password and/or user identification, challenge question, etc.) or by comparing some other unique identifier (such as MAC ID, digital signature, SIM ID) to a list of authenticated device identifiers at a headend entity (such as the aforementioned transfer manager 206). Other mechanisms may be used as well, and multiple such mechanisms may be used in parallel or sequence as desired.

"Authorization" as used herein refers generally and without limitation to the determination that the requested content/data is within the set or plurality of content/data the user (e.g., subscriber) or device may receive, and/or the proposed use of the content/data is within the allowed use set for that subscriber. For example, authorization may be used to refer to whether the requested content/data is within the subscription plan (e.g., level or tier) for the requesting user. Other security or rights-related checks may be performed as well.

The content server 206 in one variant is similar to that discussed above with respect to the content sources 103 of FIG. 1. The content server 206 stores and distributes content (such as content programming, or media content) via the network 101 for display at a consumer device (e.g., CPE 106). The content server 206 additionally provides metadata regarding the content that is to be delivered to the data server 208.

The data server 208 is configured to store and distribute information regarding the content that is to be delivered via the network 101. The data server 208 for example provides metadata from all content set to be delivered or broadcast which is needed to derive or generate an electronic program guide (EPG). In one further variant, the data server 208 provides data which is specific to a particular gateway 202. In other words, what is sent is only that which is needed by the particular gateway 202 to render the guide having e.g., a channel lineup which is specific for a user of a particular CPE 106, targeted to a geographic area associated with the gateway 202 and/or devices 106, specific to a subscriber type, etc.

As indicated in FIG. 2, a full or complete data set is provided from the data server 208 to the gateway apparatus 202. The full data set may be provided periodically, with minor updates being additionally provided at a smaller interval. The data may be pushed from the data server 208 to the gateway 202; or alternatively, the gateway 202 may actively pull the information therefrom. The full or complete data set comprises all of the information that is required by the gateway 202 to render the EPG. For example, metadata regarding the content, scheduling information, and graphic user interface (GUI) information needed from the headend are provided to the gateway 202.

Guide data may include any information contained in the end-user presentation. Typical examples include programming information such as dates, times, channels, program names, descriptions, user ratings, actor listings, thumbnails, pricing of restricted content. Advertisements such as additional promotions or service plans being offered by vendor, relevant third-party ads, TV show or movie preview images and videos may be included with the guide data. Certificates and other authentication data as mentioned previously may also be transmitted. Applications and scripts (e.g., Java applets, JavaScript code, HTML5 code) necessary to organize or display the above information may also be included.

The gateway 202 of FIG. 2 utilizes the complete data set to render an EPG on behalf of the CPE 106. As noted above, the present disclosure utilizes the gateway 202 (including e.g., the content and data server(s), headend, and other network devices) to deliver rendered guide data in a simple view to CPE 106. This feature is intended to replace prior art systems wherein, for example, logic implemented in JavaScript software is executed at least partially on the CPE to calculate and render guide information that the end user sees. In other words, when a guide is showing on a CPE (prior to the utilization of the gateway 202 as discussed herein), the CPE is executing JavaScript to process and cause display of the appropriate information and graphics. However, according to the present disclosure, rather than this occurring at the CPE 106 rendering and processing occur at the gateway 202.

Aligning with the aim of reducing processing and bandwidth, the frequency with which guide data is received at the gateway 202, transmitted to the CPE 106, and updated at the gateway 202 (from the network) may vary depending on availability of processing and bandwidth resources within the network. In addition or as an alternative, guide data may be updated on a regular schedule, e.g., hourly, daily, weekly, or based on an event, e.g., user request (limited or unlimited), gateway 202 or CPE 106 power-on, vendor decision, conditional events.

As discussed elsewhere herein, various mechanisms may be utilized to provide the simple views distributed to the CPE 106 from the gateway 202. Each of the mechanisms for providing simple views utilizes fewer network and CPE 106 resources thereby addressing the salient deficiencies of prior art methods. The simple view which is provided to the CPE 106 may include a picture, a simple pointer, or a video of the guide data. Each of the foregoing having been processed at the gateway so that they may be merely presented in a fixed format at the CPE 106 (and/or display device associated therewith). When a user at the CPE 106 enters commands to navigate the guide, the gateway 202 renders the appropriate EPG changes and provides updated simple views to the CPE 106.

As used herein, the simple view utilizing a video stream refers to the delivery of a fixed video (e.g., MPEG, MP4) that does not require further rendering of JavaScript or HTML5 at the CPE 106. Under this approach, a plurality of video streams are generated at the gateway 202 and delivered to the CPE 106. The user of the CPE 106 (or display device associated therewith) views and interacts with the guide as if the user were controlling the dynamic changes happening on the screen; however, the CPE 106 (and/or display device associated therewith) is merely displaying a video representative of the interaction. Using video allows animated elements on screen, providing the user with a rich experience that most have seen before. Having animated elements also gives the appearance that the commands inputted by the user are making local changes, e.g., moving a selection from one box to another, rather than changes to the entire screen. In the above example, a new navigation command triggers a request to the gateway 202 to produce or deliver a new video stream with an updated box selection. Hence, using this approach, rendering of dynamic elements is no longer necessary by the CPE 106.

As used herein, the simple view utilizing a still picture (e.g., PNG, JPG, TIFF) refers to the delivery of one or more pictures representative of the EPG and interaction therewith. In much the same manner as the video stream simple view, a plurality of still pictures are generated at the gateway 202 and delivered to the CPE 106 for display threat (or at a display device in communication therewith). The user of the CPE 106 (or display device associated therewith) views and interacts with the guide as if the user were controlling the dynamic changes happening on the screen; however, in this embodiment the CPE 106 (and/or display device associated therewith) is merely displaying one or more pictures representative of the interaction. Each input command by the user triggers the gateway 202 to provide an updated picture (view of the screen). This approach is ideal for low-end CPEs that cannot handle smoothly processing pre-rendered video streams or executing code (discussed below).

As used herein, the simple view utilizing a simple pointer (such as HTML or other immediately renderable formats) refers to the delivery of a set of text that renders a webpage representative of the EPG and interaction therewith. Examples of the other renderable formats include but are not limited to <canvas> tag commands, SVG commands, DirectFB commands, or WebGL commands. Some of these formats may require more complex rendering, but their availability makes this approach more flexible than the other two. In one specific embodiment, HTML5 supplemented by JavaScript or other languages such as CSS3 is used to create dynamic content at the CPE 106 (or display device). In much the same manner as the video stream simple view, a plurality of pointers are generated at the gateway 202 and delivered to the CPE 106 for display threat (or at a display device in communication therewith). The user of the CPE 106 (or display device associated therewith) views and interacts with the guide as if the user were controlling the dynamic changes happening on the screen; however, in this embodiment the CPE 106 (and/or display device associated therewith) is merely displaying one or more webpages representative of the interaction. Each input command by the user triggers the gateway 202 to provide an updated pointer.

The gateway 202 determines which of the foregoing approaches to utilize for providing the simple view to the CPE 106 based on e.g., CPE capabilities (processing power, memory, accepted bandwidth load), gateway capabilities (processing power, memory, accepted bandwidth load), cloud resources, user preference, data collected from vendor or user experience, and bandwidth availability (time of day, user demand, etc.). Alternatively, a user at the gateway 202 and/or CPE 106 may manually select a simple view technique (e.g., still picture, video, pointers, or other).

As noted above, a video stream simple view presentation is more resource-intensive than a still picture simple view presentation. Hence, the gateway 202 may elect one or the other based on what is known about the receiving device (e.g., CPE 106 and/or display apparatus). For example, to reduce client-side hardware costs, an end user may opt to use a low-end CPE 106 that lacks modern processing and memory power. In this case, a complex code combined with a video stream would be unfavorable, therefore the still picture variant is selected.

The aforementioned exemplary architecture of FIG. 2 is used to increase the efficiency of delivering guide data to client devices 106. This configuration works on any technology deployment that involves a gateway apparatus and one or more client devices that rely on that gateway for content or connectivity. However, it would be recognized by those of ordinary skill given this disclosure that other approaches and architectures may be substituted with equal success.

Figure 3:
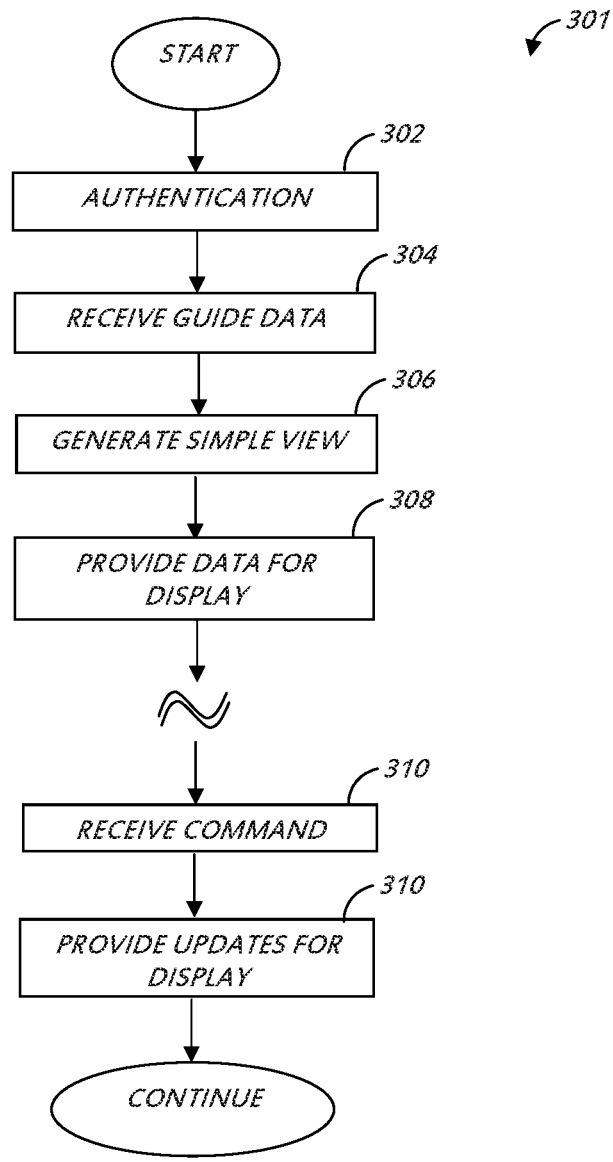
FIG. 3 is a logical flow diagram illustrating an exemplary method for providing guide data according to the present disclosure.
Figure 3A:
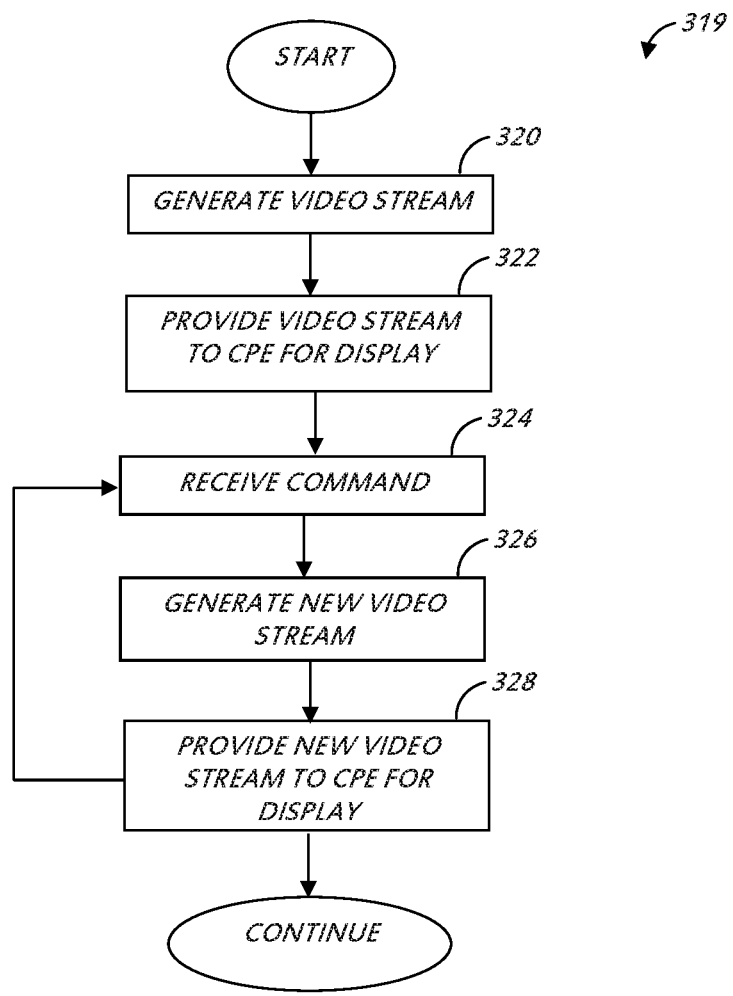
FIG. 3a is a logical flow diagram illustrating an exemplary method for providing a video-based simple view of guide data according to the present disclosure.
Figure 3B:
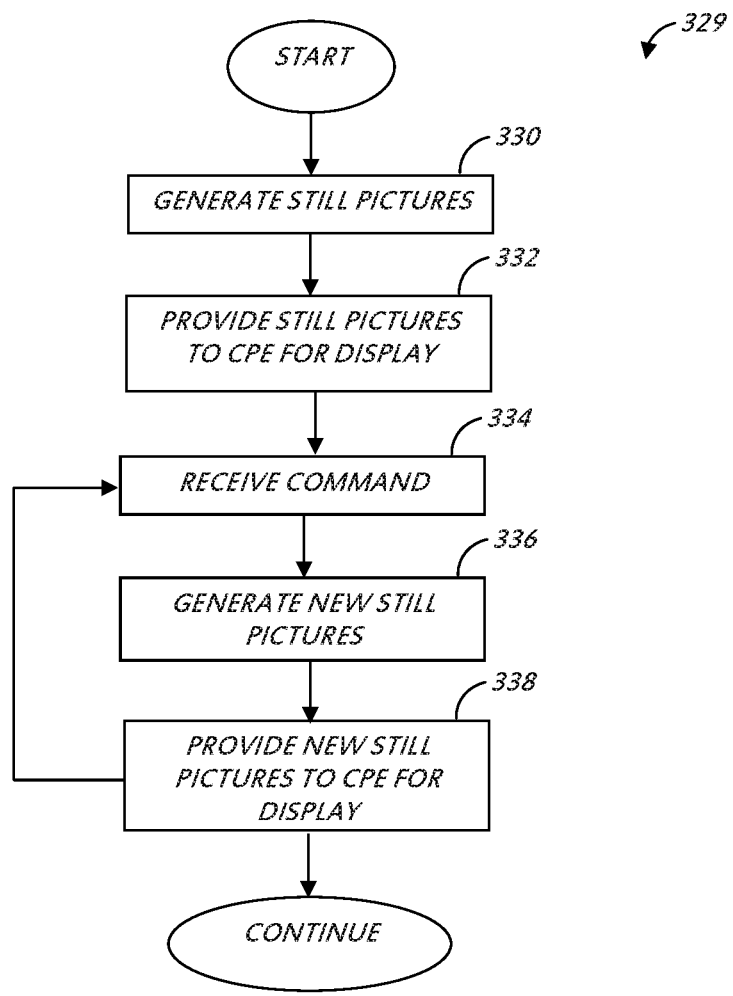
FIG. 3b is a logical flow diagram illustrating an exemplary method of providing a picture-based simple view of guide data according to the present disclosure.
Figure 3C:
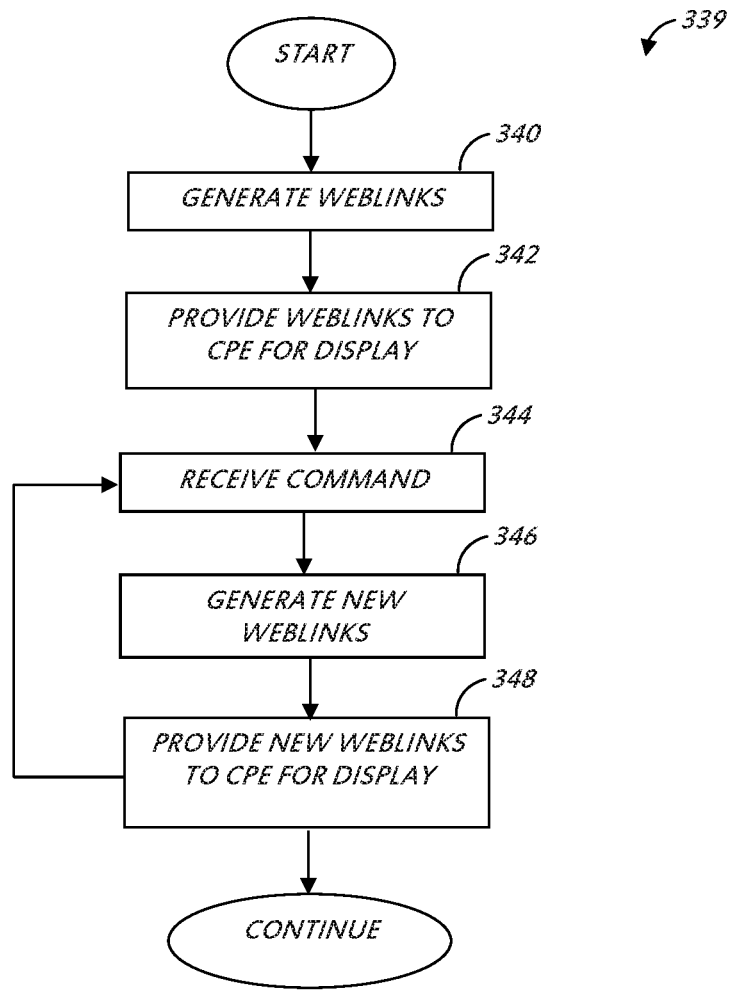
FIG. 3c is a logical flow diagram illustrating an exemplary method of providing a pointers-based simple view of guide data according to the present disclosure.

FIGS. 3-3c illustrate exemplary methods for use with the apparatus and systems disclosed in the network 200 of FIG. 2.

Example Operation—

FIG. 3 illustrates a generalized method for, efficiently providing guide data in accordance with the present disclosure.

As shown, per step 302, authentication is performed. As discussed above, the authentication may comprise an authentication of the gateway 202 (and/or a user thereof) to a network authentication entity 204, and/or authentication of the CPE 106 (and/or a user there) to the network authentication entity 204. The CPE 106 or user thereof may authenticate itself to the network 101 via the gateway 202 in one embodiment. In a further variant, the CPE 106 and/or a user thereof may authenticate itself to the gateway 202 to establish a so-called "trusted network".

Authentication and/or authorization may occur in a myriad of ways. Examples include but are not limited to peer-to-peer authentication between devices (e.g., between CPE and tablet or other user-end device, CPE and gateway, gateway and server, server and other cloud devices), user authentication (e.g., form-based username and password entry, other forms of requiring credentials), authorization authentication (e.g., billing account maintained by content vendor, address, time of day, restricted content based on geographic area and/or service plan), entity authentication (e.g., digital certificate, MAC address, session cookies), infrastructure authentication (e.g., by IP address), chained authentication, and HTTP. Multi-factor authentication using more than one authentication procedure may also be used. Examples of secure authentication technologies used include but are not limited to Secured Sockets Layer (SSL), Secure Shell (SSH, OpenSSH), Transport Layer Security (TLS), and OAuth (2.0 or otherwise). Any third-party server outside of the household would use a standardized API.

Additionally, the apparatus and methods for authorization and/or authentication may be of the type discussed in previously referenced co-owned U.S. patent application Ser. No. 12/536,724 filed Aug. 6, 2009 and entitled "SYSTEM AND METHOD FOR MANAGING ENTITLEMENTS TO DATA OVER A NETWORK", now issued as U.S. Pat. No. 8,341,242 on Dec. 25, 2012, which is incorporated herein by reference in its entirety.

Once the devices are authenticated/authorized, per step 304 a complete guide data set is received and stored at the gateway 202. As discussed above, the complete data set comprises all the data which is needed by the gateway 202 to render an electronic program guide (EPG). For example, metadata including actors, broadcast times, channel identifiers, program identifiers, etc. are provided. A complete data set may be provided to the gateway 202 from a data server 208 periodically upon a push/pull from the gateway 202 or data server 208 as noted above. Communication between the guide data server 208 and the gateway 202 may utilize in-band and/or out-of-band frequency of the existing content/data delivery network; such as via, inter alia, QAM carousel, DSG carousel, multicast, or unicast.

As noted, the gateway is fed with a completed set of information, thereby reducing or removing a need for the gateway 202 to subsequently request individualized or narrow views of guide content from the network. However, if it is later determined that the received guide data is insufficient, the gateway 202 may request and retrieve additional guide data and/or updates to the guide data.

Per step 306, the gateway 202 generates one or more simple views of the EPG. As noted above, there are various simple views which may be utilized by the CPE 106. For example, the simple view may comprise static pictures, video clips, or pointers. The gateway 202 generates these views using information obtained from the complete guide data set. In the instance a still picture simple view is being generated, the gateway 202 uses the data to generate one or more pictures representative of e.g., a first screen of the EPG. Similarly, when the video or pointers simple view is being generated, the gateway 202 uses the data to generate one or more videos or pointers representative of e.g., a first screen of the EPG.

In one embodiment, the gateway 202 is made aware of the capabilities of all of the CPE 106 in communication therewith (such as during a registration process) and based on this information the gateway 202 runs a computer program configured to determine which simple view(s) to create. For example, the gateway 202 may select a single simple view which all the devices are capable of displaying, or may generate a different type of simple view for each of the registered devices. Alternatively, the gateway 202 may generate all of the simple view alternatives and distribute them as needed. In another embodiment, the user of the CPE 106 and/or gateway 202 may determine the one or more simple views to be generated and distributed.

Next, per step 308, the generated simple views are provided to the CPE 106 for display. The gateway 202 may be configured to provide only the view which is in an appropriate format for a given device to that device. Alternatively, all of the views may be provided to each of the devices in communication with the gateway 202. Actual display of the data provided as a simple view occurs at a display apparatus in communication with the CPE 106.

After a period of time, a user at the CPE 106 interacts with the program guide and enters a command. The command is received at the gateway 202 at step 310 via e.g., any number of communication mechanisms (such as e.g., Bluetooth, wireless, MoCA, wired connections, etc.). The user input commands may be entered via a separate controller device (e.g., remote control) or physical button inputs, e.g., navigation arrows. In one variant, the user commands comprise very basic or low-level commands; examples include navigation buttons, browsing menus, and selecting program entries.

In response to the commands, per step 312, the gateway 202 provides the necessary updated simple views to the CPE 106.

It is important to note that according to the embodiment of FIG. 3, it is gateway 202, and not the CPE 106, that bears the computation load of interpreting JavaScript (or similar supplement for HTML5) and executing resource intensive operations to produce a simple view of the guide data. This shifts the processing, bandwidth, and memory resources away from the client devices and to the gateway 202, reducing the costs of the client devices 106.

As discussed above, at steps 306 and 308, the gateway 202 may generate and provide only that information which is necessary for the CPE 106 to display the first EPG screen (i.e., a menu screen), then await additional user commands. However, in another variant, the gateway 202 may generate and pre-position all of the information necessary to display any next logical command which might be entered by the CPE for the various simple views. In other words, the gateway 202 may run at least one computer program configured to determine all of the possible commands which may be received at a given EPG screen. The gateway 202 then uses this information to derive all of the next screens the user would see based on those determined commands in the appropriate simple views. When the updated screen is delivered, the gateway 202 may run the program again to generate all possible next screens given the current view, and so forth. The gateway 202 may either store the simple views for all possible user commands for delivery per step 312, or may send them to the CPE 106 at the same time as the original simple view of the first screen is transmitted to the CPE 106. According to this second model, the user commands are not transmitted to the gateway 202 but rather processed at the CPE 106 for a determination of which simple view updated screen to display.

The updated simple views may be predicted and provided to the CPE 106 in advance of the user's actual input of a command. For example, moving a selection cursor or box to an "OK" or "Cancel" selection increases the likelihood that the user will select that particular choice. In that case, a pre-rendered simple view containing what would show in the following screen is identified and/or generated and delivered to the CPE 106. This improves the user experience by reducing wait times, increasing smoothness, reducing choppiness of animation due to any particularly complex gateway-side calculations, etc. Predictions require additional processing and bandwidth capabilities at the gateway 202.

In some embodiments, the gateway 202 is further configured to remember where the user left off the last time the guide was displayed. Upon returning to the guide, the CPE 106 displays the same screen as before. This introduces a further level of seamlessness and the appearance that the user is controlling directly what is displayed in front of the user rather than being shown a pre-rendered graphic.

FIGS. 3a-3c discloses various methods for providing simple views to the client. Each of the illustrated methods replace what would normally be JavaScript-supported HTML5 guides rendered and displayed by the CPE 106, with pre-rendered (i.e., rendered at the gateway 202) replacement video, simple HTML, or picture. These methods thereby reduce the redundant bandwidth used as well as client device costs since less processing power and memory are needed.

According to the method 319 of FIG. 3a, a powerful client device 106 containing a transcoder processes and causes display of a video stream that contains the program guide. In this manner, an "animated" guide may be provided; the animated guide is more aesthetically pleasing for the user than the other simple views discussed herein. To accomplish this method, as shown, per step 320, a plurality of video streams are generated at the gateway 202 and provided to the CPE 106 for display (step 322).

As noted above, the video streams which are generated at step 320 may comprise only those necessary for the display device associated to the client device 106 to display an initial menu screen. Alternatively, the gateway 202 may additionally derive the all video streams which might be necessary based on all possible user commands. These are then stored at the gateway 202 or provided to the CPE 106 in anticipation of a command.

Referring again to the method of FIG. 3a, per step 324 a command is received from a user interacting with the guide. In response to the command, per step 326, the gateway generates a new stream which corresponds to the updated view and provides the new stream to the device 106 (step 328). Alternatively, as noted above, the gateway 202 may pre-generate all update streams which may be needed by a user when interacting with the guide (e.g., all those which are expected to be needed based on a current view). These may be pre-positioned at the CPE 106; in which case, the request (step 326) is not sent to the gateway 202. Alternatively, the gateway 202 may simply store the pre-generated streams and provide them in response to the command at step 328.

FIG. 3b illustrates a method 329 for providing guide data as still pictures for devices 106 which have less processing power and/or memory than those discussed above with respect to FIG. 3a. This would result in slightly higher in-home bandwidth usage than the simple HTML, but has the advantage of being capable of being used with much lower-end boxes.

As shown, per step 330, a plurality of images are generated at the gateway 202 and provided to the CPE 106 for display (step 332). As noted above, the still images which are generated at step 330 may comprise only those necessary for the display device associated to the client device 106 to display an initial menu screen. Alternatively, the gateway 202 may additionally derive the all images which might be necessary based on all possible user commands. These are then stored at the gateway 202 or provided to the CPE 106 in anticipation of a command.

Next, at step 334 a command is received from a user interacting with the guide. In response to the command, per step 336, the gateway generates a new image which corresponds to the updated view and provides the new image to the device 106 (step 338). Alternatively, as noted above, the gateway 202 may pre-generate all update images which may be needed by a user when interacting with the guide (e.g., all of the images which might be necessary given the current view). These may be pre-positioned at the CPE 106; in which case, the request (step 336) is not sent to the gateway 202. Alternatively, the gateway 202 may simply store the pre-generated images and provide them in response to the command at step 328.

Under a third method 339, the guide data is rendered into pointers for simple HTML. In the instance the gateways 202 and/or servers cannot generate a video stream, and/or the CPE 106 cannot transcode a video stream, the simple HTML is calculated after JavaScript operations are complete. This resultant pointer (e.g., HTML) is sent to a CPE and rendered without the overhead of the JavaScript interpretation. Examples of other potentially formats that are immediately renderable by the CPE 106 include <canvas> tag commands, SVG commands, DirectFB commands, or WebGL commands, which may be more complex than simple HTML.

Per step 340, a plurality of pointers are generated at the gateway 202 and provided to the CPE 106 for display (step 342). The gateway 202 may generate only those pointers which are necessary for the display device associated to the client device 106 to display an initial menu screen. Alternatively, the gateway 202 may derive the all pointers which might be necessary based on all possible user commands. These are then stored at the gateway 202 or provided to the CPE 106 in anticipation of a command. Next, per step 344 a command is received from a user interacting with the guide. In response to the command, per step 346, the gateway 202 generates a new pointer which corresponds to the updated view (and/or identifies a pre-generated pointer) and provides the new pointer to the device 106 (step 348).

The foregoing methods of FIGS. 3-3c utilize a gateway 202 apparatus and a client device 106, each of which will be discussed in detail below.

Exemplary Client Device—

Figure 4:
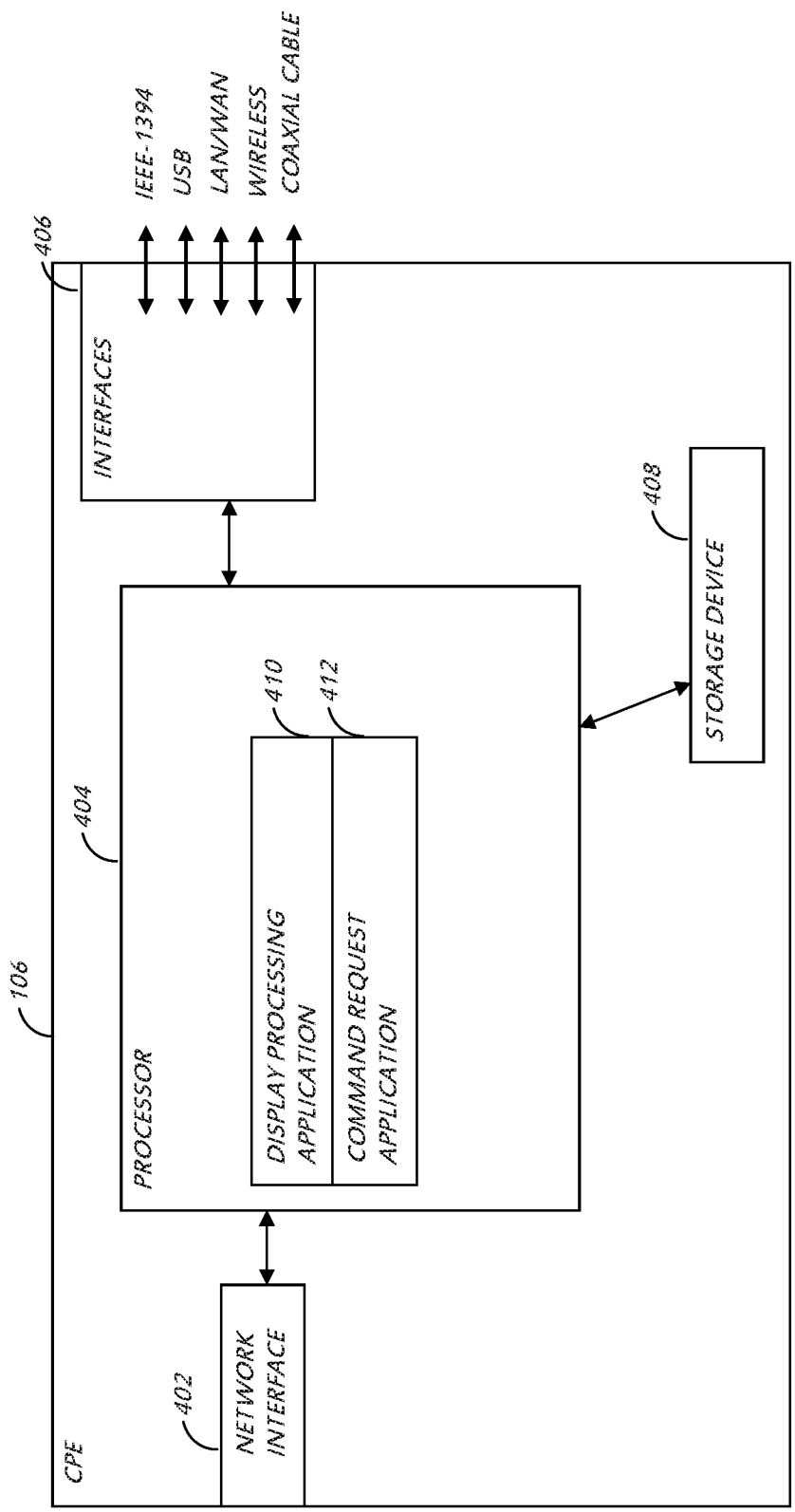
FIG. 4 is a functional block diagram illustrating an exemplary client device for use with the present disclosure.

Referring now to FIG. 4, an exemplary client device or CPE 106 is illustrated. As shown, the CPE 106 generally comprises a network interface 402, processor 404, a storage device 408, and a number of backend interfaces 406 for communication between the CPE 106 and one or more external devices (such as other devices in the home network, a display apparatus, and/or a controller). In one variant, the CPE 106 comprises an IP-enabled device. Additionally, as noted above in one embodiment a single user premise may comprise more than one CPE 106 each in communication with the same gateway 202. It will be appreciated that while described somewhat generically herein, the individual client devices may both (i) be heterogeneous or homogeneous in nature/capability; and (ii) be integrated into or make use of extant devices/form factors such as smartphones, tablets, phablets, laptops, handhelds, gaming devices, wireless routers, etc.

The network interface 402 enables the CPE 106 to communicate to the network 101. For example, the network interface 402 may comprise an RF tuner capable of receiving programming content from e.g., the content server 206. Additionally, data may be transmitted to the CPE 106 via the network interface 402. In the event the gateway 202 functions as a content delivery proxy for the CPE 106, however, the CPE 106 may not comprise a network interface 402 but rather content is received via a backend interface 406 with the gateway 202.

In the illustrated embodiment, the processor 404 is configured to execute at least a display processing application 410 and a command request application 412.

The display processing application 410 comprises computer instructions which enable the CPE 106 to display the received simple view of the guide data (e.g., as still images, video segments, or pointers). The processing application 410 is an optional application which may be omitted from the CPE 106 in the event display processing occurs at a display device other than the CPE 106 but in communication therewith.

The command request application 412 enables the CPE 106 to, in response to receiving commands from a user, issue a request to the gateway 202 for an updated view. The updated view may comprise updated still images, updated video streams, or updated pointers. As noted above, the gateway 202 in response to the request, generates the updated views. Alternatively, as also described in greater detail above, the gateway 202 may pre-generate all of the updated views which may be anticipated to be needed based on the current view. In this instance, upon receiving the CPE 106 command request, the gateway 202 simply identifies the necessary updated (based on the issued request/command).

In a further embodiment, the CPE 106 rather than the gateway may store the pre-generated views. According to this model, once these are generated at the gateway 202 they are simply passed to the CPE 106 for storage thereat. Upon user request, the CPE 106 identifies the appropriate updated view. According to this embodiment, the command request application 412 is optional.

Via the backend interfaces 406, the CPE 106 is connected to the gateway 202, as well as any number of other external devices and/or home networked devices (e.g., other CPE 106, a remote controller, a display apparatus, etc.). Exemplary interfaces useful with the CPE 106 include but are not limited to coaxial cable (including Multimedia over Coax (MoCA)), Wi-Fi, infrared, USB, Ethernet, Bluetooth, etc.

The storage device 408 comprises a data storage entity configured to store e.g., the guide data and any updates thereto. The storage device 408 data and may comprise any one of a number of types of memory (e.g., RAM, SRAM, DRAM, magnetic hard-disk drives (HDD), solid-state drives (SSD), hybrid SSD drives having components associated with HDD and SSD, etc.).

Exemplary Gateway Device—

Referring now to FIG. 5, an exemplary gateway apparatus 202 is shown. The gateway 202 generally includes a network interface 502, a processor 504, a storage apparatus 506, and a number of backend interfaces 508 for communication to e.g., the CPE 106. In one variant, as noted above, a single user premise may comprise more than one gateway 202 in communication with one or more CPE 106. As noted above, the present disclosure enables the gateway 202 to act as a proxy for the CPE 106 with respect to only the guide data. The CPE 106 are, in this embodiment, configured to request and receive content directly from the network 101 without utilizing the gateway 202.

It is appreciated that in another variant the gateway 202 may additionally act as a proxy for the CPE 106 with respect to delivery of other content and/or data as discussed in previously referenced co-owned, co-pending U.S. patent application Ser. No. 13/888,210 (published as U.S. Patent Application Publication No. 2013/0318560).

In yet another embodiment, the gateway 202 further communicates with a non-managed network and thereby enables content and/or data to be obtained from networks other than the managed network (for example content and/or data may be obtained via communication with $3^{rd}$ party entities via the Internet), as discussed in previously referenced co-owned, co-pending U.S. patent application Ser. No. 12/582,619 (published as U.S. Patent Application Publication No. 2011/0093900).

Referring again to FIG. 5, the network interface 502 enables the gateway 202 to communicate to the network 101. For example, the network interface 502 may comprise an RF tuner capable of receiving programming content from e.g., the content server 206. Additionally, data may be transmitted to the gateway 202 via the network interface 402 including data from the data server 208. In the event the gateway 202 functions as a content delivery proxy for the CPE 106, content and/or data received from the content server 204 is then delivered to the CPE 106.

In the illustrated embodiment, the processor 504 is configured to execute at least a simple view generation application 510, a command response application 512, and an update processing application 514.

The simple view generation application 510 comprises a plurality of instructions which when executed enable the guide to be rendered (on behalf of the CPE 106). As discussed in detail elsewhere herein, the gateway 202 may render the guide in any one of a number of simple formats, for example, still pictures, video streams, or pointers. In one embodiment, the simple view generation application 510 uses data received from the data server 208 to generate one or more simple views of the initial guide screens. In addition, the simple view generation application 510 may be utilized to pre-generate all of the simple view screens that may be necessary given the current view.

Additionally, the simple view generation application 510 may be configured to generate all of the simple view types discussed herein. Alternatively, it may determine which one or ones of the views are necessary based on the configuration of the CPE 106 in communication therewith. Given the three exemplary approaches of rendering simple views discussed herein, the least complex approach is to send still pictures to be rendered by the CPE 106. A more capable CPE 106, on the other hand, may be able to display simple views rendered as video streams and/or pointers.

The command response application 512 comprises a computer application configured to enable the gateway 202 to in response to receiving various user commands (via communication with the CPE 106) generate updated simple views. Specifically, information contained in the request (and generated from the initial user command) is used to effect the current view, thereby necessitating an updated view. In another variant, information from the request is used to identify one of a plurality of previously generated updated views.

The update processing application 514 comprises a computer application configured to enable the gateway 202 to generate a plurality of simple view updates to an electronic program guide. That is, the update processing application 514 utilizes information received in a request (as processed from an initial user command) to determine changes that are needed to the current screen. The update processing application 514 in conjunction with the simple view generation application 510 then generates updated views. The update processing 514 may occur a priori (e.g., before a CPE 106 request is received) or on the fly (e.g., generated only as needed).

In a further embodiment, the gateway 202 may be configured to establish and authenticate devices within a trusted domain. To this end, an authentication application (not shown) authenticates CPE 106 such as via the authentication server 204 or other headend entity.

Via the backend interfaces 506, the gateway 202 communicates to the CPE 106, as well as any number of other external devices and/or home networked devices (e.g., other gateway 202, etc.). Exemplary interfaces useful with the gateway 202 include but are not limited to coaxial cable (including Multimedia over Coax (MoCA)), Wi-Fi, infrared, USB, Ethernet, Bluetooth, etc.

The storage device 508 comprises a data storage entity configured to store e.g., the guide data and any updates thereto. The storage device 508 data and may comprise any one of a number of types of memory (e.g., RAM, SRAM, DRAM, magnetic hard-disk drives (HDD), solid-state drives (SSD), hybrid SSD drives having components associated with HDD and SSD, etc.).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A computerized method for delivering electronic program guide (EPG) data over a content distribution network, the computerized method comprising:
    accessing the EPG data from a computerized network entity configured to be in data communication with the content distribution network;
    accessing data to enable determination of at least one capability of a computerized client device configured to be in data communication with the content delivery network;
    based on the at least one capability of the computerized client device not meeting at least one criterion, generating a first static representation of the EPG data based on at least a first portion of the accessed EPG data, the first static representation configured to reduce an amount of computing resources required to be used by the computerized client device relative to a non-static representation; and
    transmitting the generated first static representation to the computerized client device, thereby enabling the computerized client device to cause rendering of the first static representation.

2. The computerized method of claim 1, further comprising:
    receiving a signal from the client device with respect to the first static representation;
    responsive to the signal from the client device, generating a second static representation of the EPG data based on at least a second portion of the EPG data; and
    providing the second static representation of the EPG data to the client device, the second static representation being displayable by the client device subsequent to the signal, the generation of the second static representation enabling reduction of processing power used by the client device.

3. The computerized method of claim 1, further comprising predicting the first static representation of the EPG data prior to the generating thereof, the predicting being based at least on an action by a user of the client device, the action preceding an input of a command to the client device.

4. The computerized method of claim 3, further comprising predicting the second static representation of the EPG data prior to the generating thereof, the predicting being based at least on the signal from the client device with respect to the first static representation, the signal comprising an action by the user, the action preceding an input of a command to the client device.

5. The computerized method of claim 1, wherein the accessing of the EPG data from the computerized network entity comprises selectively accessing a portion of the EPG data based at least on a geographic area associated with the client device.

6. The computerized method of claim 3, wherein the accessing of the EPG data from the computerized network entity comprises retrieving a complete set of the EPG data, and periodically retrieving additional data representative of an update to the complete set of the EPG data.

7. The computerized method of claim 1, wherein each of the first and second static representations of the EPG data comprises pre-rendered content selected from the group consisting of one or more still images, one or more video segments, or one or more pointers.

8. A computerized network apparatus disposed in a content delivery network, the computerized network apparatus comprising:
- a processor apparatus configured to be in data communication with at least a server and one or more client devices; and
- a non-transitory storage apparatus in data communication with the processor apparatus and comprising a storage medium, the storage medium being configured to store a computer program thereon, the computer program comprising a plurality of instructions configured to, when executed by the processor apparatus, cause the computerized network apparatus to:
  - retrieve guide data from the server;
  - access data to enable determination of at least one capability of a computerized client device; and
  - based at least on the level of the at least one capability of the computerized client device not meeting at least one criterion, generate a first static representation of the guide data, and enable rendering of the first static representation at the computerized client device, the rendering of the first static representation being associated with reduced usage of computing resources by the computerized client device relative to a non-static representation.

9. The computerized network apparatus of claim 8, wherein the plurality of instructions are further configured to, when executed by the processor apparatus, cause the computerized network apparatus to:
- select the first static representation over at least a second static representation; and
- deliver the first static representation to the computerized client device.

10. The computerized network apparatus of claim 8, wherein the computerized client device comprises a mobile device, the mobile device comprising:
- a network interface;
- a processor apparatus configured to be in data communication with the network interface; and
- a non-transitory computer-readable apparatus comprising a storage medium, the storage medium being configured to store a computer program having a plurality of instructions, the plurality of instructions being configured to, when executed by the processor apparatus, cause the computerized client device to:
  - receive the first static representation via the network interface; and
  - cause display of the first static representation.

11. The computerized network apparatus of claim 8, wherein the first static representation of the guide data comprises at least one of a still image, a video clip, or a web page, each comprising content generated by the computerized network apparatus based at least on a first portion of the retrieved guide data so as to enable rendering via the computerized client device.

12. The computerized network apparatus of claim 8, wherein the plurality of instructions are further configured to, when executed by the processor apparatus, cause the computerized network apparatus to:
- identify one or more updated static representations based on an action of a user of the computerized client device, the action of the user being associated with a likelihood of an occurrence of a command of the user;
- generate the one or more updated static representations; and
- based at least on receipt of the command of the user, deliver at least one of the one or more updated static representations to the computerized client device.

13. The computerized network apparatus of claim 12, wherein the generation of the one or more updated static representations comprises prioritization of some of the identified one or more updated static representations to be generated.

14. The computerized network apparatus of claim 8, wherein the computing resources is associated with the computerized client device and comprise one or more of processing power, memory, or bandwidth load associated with the computerized client device.

15. The computerized network apparatus of claim 8, wherein:
- the plurality of instructions are further configured to, when executed by the processor apparatus, cause the computerized network apparatus to determine a level of an available computing resource associated with the computerized network apparatus; and
- the generation of the first static representation of the guide data is further based on the level of the available computing resource associated with the computerized network apparatus.

16. The computerized network apparatus of claim 8, wherein:
- the plurality of instructions are further configured to, when executed by the processor apparatus, cause the computerized network apparatus to receive, from a user of the computerized network apparatus, a selection of a type of the first static representation of the guide data; and
- the generation of the first static representation of the guide data comprises generation of pre-rendered content corresponding to the selected type.

17. A networked apparatus comprising:
- means for accessing guide data from a server device;
- means for determining at least one capability of a client device;
- means for generating a first static representation of the guide data based on the at least one capability of the client device not meeting at least one criterion; and
- means for delivering the generated first static representation to the client device, the first static representation being displayable via the client device, the generation of the first static representation by the networked apparatus enabling a reduction of an amount of computing resources used by the client device relative to a non-static representation.

18. The networked apparatus of claim 17, wherein the first static representation of the guide data comprises one or more of a still image, a video segment, or a pointer page.

19. The networked apparatus of claim 17, wherein the at least one capability of the client device comprises at least one of processing power, memory, or bandwidth associated with the at least one client device.

20. The networked apparatus of claim 17, further comprising:
- means for predicting at least one second static representation of the guide data based on one or more signals received from the client device, the one or more signals being indicative of actions taken by a user of the client device;
- means for generating the predicted at least one second static representation; and
- means for delivering the generated at least one second static representation based at least on one or more additional signals received from the client device, the one or more additional signals being indicative of a command by the user of the client device.

* * * * *